(12) United States Patent
Oyama

(10) Patent No.: US 10,056,994 B2
(45) Date of Patent: Aug. 21, 2018

(54) CONTROLLER, COMMUNICATION SYSTEM, AND RADIO CONTROL METHOD

(71) Applicant: FUJITSU LIMITED, Kawasaki-shi, Kanagawa (JP)

(72) Inventor: Teppei Oyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/641,293

(22) Filed: Jul. 4, 2017

(65) Prior Publication Data

US 2018/0019829 A1 Jan. 18, 2018

(30) Foreign Application Priority Data

Jul. 15, 2016 (JP) .................................. 2016-139953

(51) Int. Cl.
*H04B 7/02* (2018.01)
*H04B 17/30* (2015.01)
*H04B 7/0413* (2017.01)

(52) U.S. Cl.
CPC ........... *H04B 17/30* (2015.01); *H04B 7/0413* (2013.01)

(58) Field of Classification Search
CPC ............ H04W 16/14; H04W 72/0453; H04W 84/045; H04W 88/12; H04W 36/30; H04L 45/46; H04B 7/024; H04B 7/2606; H04B 7/0452; H04B 17/345; H04B 7/0413; H04B 15/00; H04B 17/12; H04B 17/318; H04B 1/1027

See application file for complete search history.

(56) References Cited

U.S. PATENT DOCUMENTS

2012/0077531 A1 3/2012 Acharya et al.
2012/0252462 A1* 10/2012 Fahldieck ............. H04W 36/32
455/438

FOREIGN PATENT DOCUMENTS

JP 2012-75104 4/2012

OTHER PUBLICATIONS

3GPP TS 36.211 V13.1.0, "3rd Generation Partnership Project; Technical Specification Group Radio Access Network; Evolved Universal Terrestrial Radio Access (E-UTRA); Physical channels and modulation (Release 13)", Mar. 2016 (155 pages).

* cited by examiner

*Primary Examiner* — Rahel Guarino
(74) *Attorney, Agent, or Firm* — Fujitsu Patent Center

(57) ABSTRACT

A controller controlling radio transmission of a plurality of radio devices in a radio communication system in which each of the plurality of radio devices constituting a cluster transmits data with a same frequency and with transmission weights each of the plurality of radio devices to a terminal device belonging to the cluster, the controller includes, an acquisition unit configured to acquire radio propagation characteristics between the terminal device and the each of plurality of radio devices, a determination unit configured to determine radio a plurality of devices constituting the cluster to which the terminal device belongs, based on the acquired radio propagation characteristics, and a control unit configured to determine transmission weights of each of the plurality of radio devices constituting the cluster, based on the radio propagation characteristics of each of the plurality of radio devices constituting the cluster.

20 Claims, 19 Drawing Sheets

FIG.8

| CLUSTER NUMBER | RADIO DEVICE | BELONGING TERMINAL DEVICE |
|---|---|---|
| C3 | 200-6<br>200-7<br>200-10<br>200-11 | 100-2 |

| CLUSTER NUMBER | RADIO DEVICE | BELONGING TERMINAL DEVICE |
|---|---|---|
| C4 | 200-5<br>200-6<br>200-9<br>200-10 | 100-3 |
| C5 | 200-2<br>200-3<br>200-6<br>200-7 | 100-4 |

| CLUSTER NUMBER | RADIO DEVICE | BELONGING TERMINAL DEVICE |
|---|---|---|
| 1 (C7) | 200-5<br>200-6<br>200-9<br>200-10 | 100-10<br>100-11<br>100-12<br>100-13<br>100-14 |
| 2 (C8) | 200-2<br>200-3<br>200-6<br>200-7 | 100-15<br>100-16<br>100-17<br>100-18<br>100-19 |

| CLUSTER NUMBER | RADIO DEVICE | BELONGING TERMINAL DEVICE |
|---|---|---|
| 1 (C10) | 200-1<br>200-2 | 100-20<br>100-21 |
| 2 (C11) | 200-2<br>200-3 | 100-22<br>100-23 |
| 3 (C12) | 200-3<br>200-4 | 100-24<br>100-25 |

322

US 10,056,994 B2

CONTROLLER, COMMUNICATION SYSTEM, AND RADIO CONTROL METHOD

CROSS-REFERENCE TO RELATED APPLICATION

This application is based upon and claims the benefit of priority of the prior Japanese Patent Application No. 2016-139953, filed on Jul. 15, 2016 the entire contents of which are incorporated herein by reference.

FIELD

The present invention relates to a controller, a communication system, and a radio control method.

BACKGROUND

As a technology regarding the realization of high-speed transfer or the efficient use of a radio resource in radio communication, a cooperative transmission technology based on multiple input multiple output (MIMO) has been known.

The MIMO is a technology by which a plurality of radio devices cooperatively transmits data using radio waves of the same frequency with their respective transmission weights. The plurality of cooperative radio devices is called a cluster. Based on the radio propagation characteristics between a terminal device and the radio devices, the radio devices constituting the cluster transmit radio waves with the addition of transmission weights so that the receiving power to receive data at the terminal device becomes great. As a result, the terminal device is allowed to receive the data included in the radio waves of the same frequency. Since the plurality of radio devices transmits data with a single frequency, the MIMO is advantageous in that the effective use of a frequency resource is made possible.

A technology regarding a controller is described in Japanese Laid-open Patent Publication No. 2012-75104.
Non-patent document 1: 3GPP TS36. 211 V13. 1. 0 (2016-03)

SUMMARY

A controller controlling radio transmission of a plurality of radio devices in a radio communication system in which each of the plurality of radio devices constituting a cluster transmits data with a same frequency and with transmission weights each of the plurality of radio devices to a terminal device belonging to the cluster, the controller includes, an acquisition unit configured to acquire radio propagation characteristics between the terminal device and the each of plurality of radio devices, a determination unit configured to determine radio a plurality of devices constituting the cluster to which the terminal device belongs, based on the acquired radio propagation characteristics, and a control unit configured to determine transmission weights of each of the plurality of radio devices constituting the cluster, based on the radio propagation characteristics of each of the plurality of radio devices constituting the cluster, and instruct each of the plurality of radio devices constituting the cluster to transmit the data with the determined transmission weights of each of the plurality of radio devices constituting the cluster to the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of the cluster information table 322.
FIG. 10 is a diagram illustrating an example of a cluster information table when the communication system 10 is put into a state illustrated in FIG. 9.
FIG. 15 is a diagram illustrating an example of a cluster information table 322.
FIG. 19 is a diagram illustrating an example of the cluster information table 322 in the case of FIG. 18.

DESCRIPTION OF EMBODIMENTS

Radio waves received from the radio devices of a cluster to which a terminal device belongs may be interfered with radio waves transmitted from the radio devices of other adjacent clusters. Particularly, when a terminal device is positioned near an adjacent cluster, the receiving power to receive radio waves at the terminal device, which are transmitted from the adjacent cluster, becomes greater and thus the transmitted radio waves interfere with the receiving radio waves of the terminal device to a greater extent. Due to the occurrence of the interference, there may be a case where the terminal device does not receive data with receivable receiving quality or higher.

In addition, there is a likelihood that the distance between a terminal device and some of radio devices inside a cluster becomes large depending on the position of the terminal device inside the cluster, whereby the receiving power to receive radio waves at the radio devices reduces. When the receiving power reduces, there may be a case where the terminal device does not receive data with receivable receiving power or greater.

First Embodiment

A first embodiment will be described. In the first embodiment, a controller acquires the radio propagation characteristics between a terminal device and radio devices, and determines a plurality of radio devices constituting a cluster corresponding to the terminal device based on the acquired radio propagation characteristics. In addition, the controller determines the respective transmission weights of the plurality of determined radio devices inside the cluster based on the respective radio propagation characteristics of the plurality of determined radio devices constituting the cluster, and instructs the plurality of radio devices to transmit to the terminal device data with the determined transmission weights.

The radio propagation characteristics are barometers indicating how radio waves transmitted from a radio device or a terminal device reach an opponent device, and include, for example, the receiving power to receive the radio waves at the opponent device, the dissipation rate of the receiving power, or the like.

Further, the transmission weights are barometers for determining the characteristics of transmitted radio waves, and include, for example, a phase, transmitting power, both of the phase and the transmitting power, or the like of the radio waves. For example, it is described in "3GPP TS 36.211 V13.1.0 (2016-03)" stipulating provisions on MIMO that transmitted radio waves are multiplied by a complex number expressed by a size (corresponding to power) and polar coordinates (a phase is changed). The transmission weights include, for example, a "size" indicating power and a "complex number" indicating a phase described in "3GPP TS 36.211 V13.1.0 (2016-03)".

(Configuration Example of Communication System)

Figure 1:
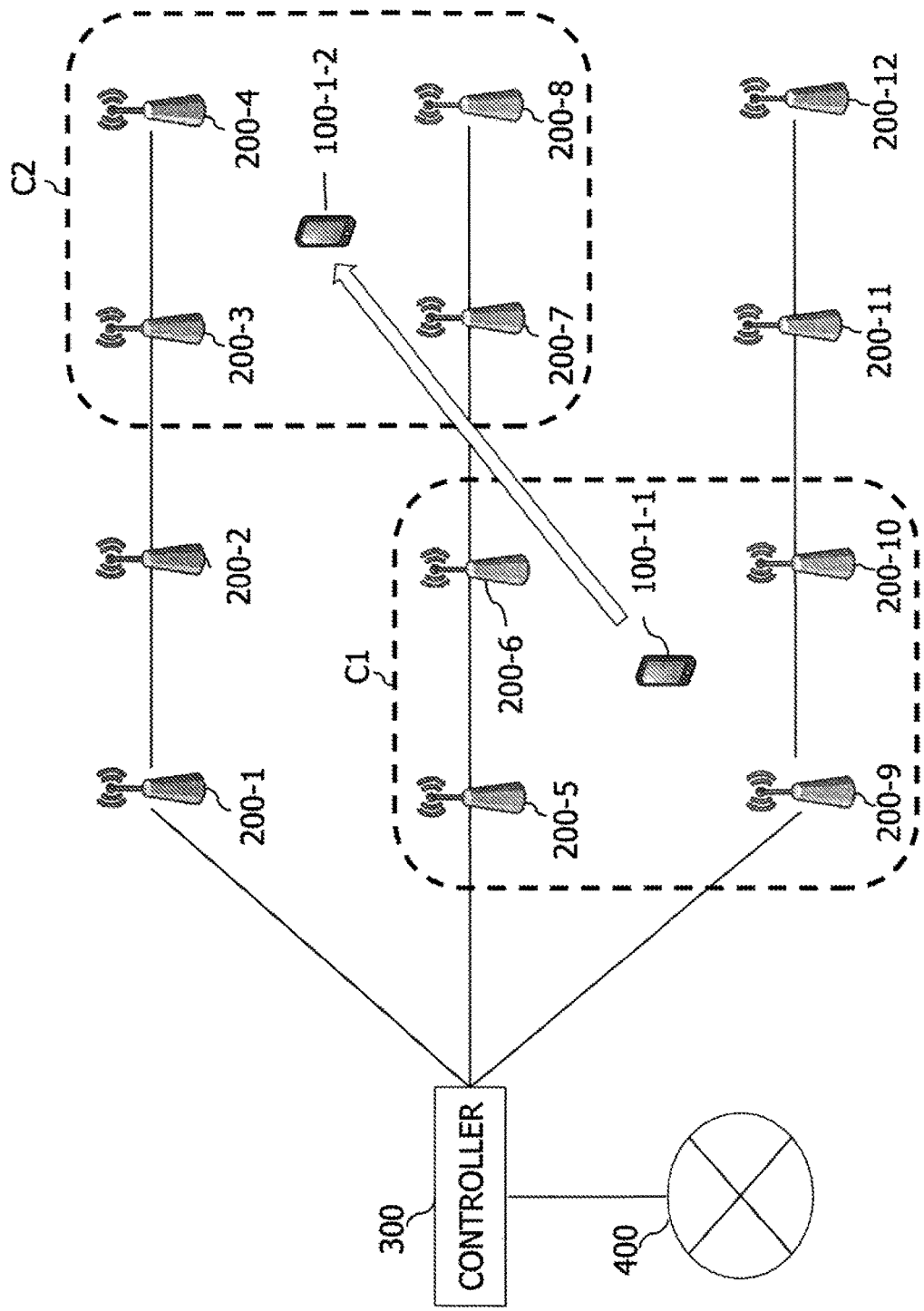
FIG. 1 is a diagram illustrating a configuration example of a communication system 10.

FIG. 1 is a diagram illustrating a configuration example of a communication system 10. The communication system 10 has a terminal device 100-1 (hereinafter called a terminal device 100 as occasion demands), radio devices 200-1 to 200-12 (hereinafter called radio devices 200 as occasion demands) that perform radio transmission and reception, a controller 300 that controls the radio transmission of the radio devices 200, and an external network 400.

The communication system 10 is, for example, a local area network such as wireless fidelity (Wi-Fi) or a radio communication network such as long term evolution (LTE). The communication system 10 is a communication system to offer communication to the terminal device 100 so that the terminal device 100 accepts services from the external network 400 such as the Internet.
The terminal device 100 transmits and receives data to and from the external network 400 via the radio devices 200 and the controller 300 to realize communication.

In addition, the communication system 10 is a communication system in which the radio devices 200 perform cooperative transmission with respect to the terminal device 100. The cooperative transmission is, for example, single-user adaptive MIMO or multi-user MIMO allowing the transmission of data to the plurality of terminal devices 100 simultaneously or parallelly. In the communication system 10, clusters C1 and C2 are constituted by the plurality of radio devices 200.

The clusters are the groups of the radio devices that perform the cooperative transmission with respect to the terminal device 100 using the radio waves of the same frequency, and cooperatively transmit data to the terminal device 100 belonging to the clusters. In addition, the clusters may be constituted by all or some of the radio devices 200 of the communication system 10.

The controller 300 is a communication device that controls radio waves transmitted from the radio devices 200. The controller 300 is connected to the radio devices 200, for example, in a wired fashion using an optical cable or the like. In FIG. 1, the controller 300 is directly connected to the radio devices 200-1, 200-5, and 200-9, and indirectly connected to the remaining radio devices 200 via the radio devices 200-1, 200-5, and 200-9. However, the controller 300 may be directly connected to all the radio devices 200. When transmitting data to the terminal device 100, the controller 300 determines a cluster to which the terminal device 100 belongs. In addition, the controller 300 determines the respective transmission weights of the radio devices 200 constituting the cluster, and instructs the radio devices 200 to transmit data with the determined transmission weights. The transmission weights include, for example, the phase and the transmitting power of radio waves that transmit the data.

The radio devices 200 are communication devices that transmit data to the terminal device 100 using radio waves. The radio devices 200 are, for example, evolved Nodes B (eNodeB) in LTE or radio equipment (RE) in which a radio unit is separated. In addition, the radio devices 200 are, for example, Wi-Fi access points. The radio devices 200 transmit data to the terminal device 100 with the transmission weights instructed by the controller 300.

As described above, in the communication system 10, the controller 300 dynamically determines the cluster with respect to the moving terminal device 100. For example, when the terminal device 100 does not exist in the communication system 10 or when the terminal device 100 exists in the communication system 10 but does not perform communication, a cluster does not exist since there is no need to transmit data to the terminal device 100. When transmitting data to the terminal device 100, the controller 300 dynamically determines the radio devices 200 constituting the cluster of the terminal device 100 according to the radio propagation characteristics between the terminal device 100 and the radio devices 200.

In FIG. 1, a terminal device 100-1-1 is the terminal device 100-1 that first receives data transmitted from the external network 400 to the terminal device 100-1 by the controller 300. On the other hand, in FIG. 1, a terminal device 100-1-2 is the terminal device 100-1 that receives the data transmitted from the external network 400 to the terminal device 100-1 again by the controller 300 when the terminal device 100-1 moves after the reception of the data by the terminal device 100-1-1.

When receiving the data to be transmitted to the terminal device 100-1-1, the controller 300 acquires the radio propagation characteristics between the terminal device 100-1-1 and the respective radio devices 200 and selects a plurality of the radio devices 200 of which the acquired radio propagation characteristics are higher (via which the terminal device 100-1-1 is to receive the data with greater power). Then, the controller 300 determines the plurality of selected radio devices 200 as the radio devices 200 constituting the cluster to which the terminal device 100-1-1 belongs.

In FIG. 1, the controller 300 selects, for example, four radio devices 200-5, 200-6, 200-9, and 200-10 in an order in which the receiving power to receive at the terminal device 100-1-1 the data from the radio devices 200 is greater. Then, the controller 300 determines the cluster C1 constituted by the four selected radio devices 200 as the cluster to which the terminal device 100-1-1 belongs.

With the elapse of time, the terminal device 100-1 moves from terminal device 100-1-1 to the terminal device 100-1-2. At this time, when receiving the data to be transmitted from the external network 400 to the terminal devices 100-1, the controller 300 discards the cluster C1 and determines the cluster to which the terminal device 100-1-2 belongs as a new cluster. In FIG. 1, the controller 300 selects four radio devices 200-3, 200-4, 200-7, and 200-8 in the same way as when the cluster C1 is determined, and determines the cluster C2 constituted by the four selected radio devices 200 as the cluster to which the terminal device 100-1-2 belongs.

As described above, when transmitting the data to the terminal device 100, the controller 300 acquires the radio propagation characteristics between the terminal device 100 and the radio devices 200 and determines the plurality of radio devices 200 of which the acquired radio propagation characteristics are higher as the cluster to which the terminal device 100 belongs. Thus, the terminal device 100 is allowed to receive data from the plurality of radio devices 200 of which the radio propagation characteristics are higher regardless of where the terminal device 100 moves.

(Configuration Example of Controller)

Figure 2:
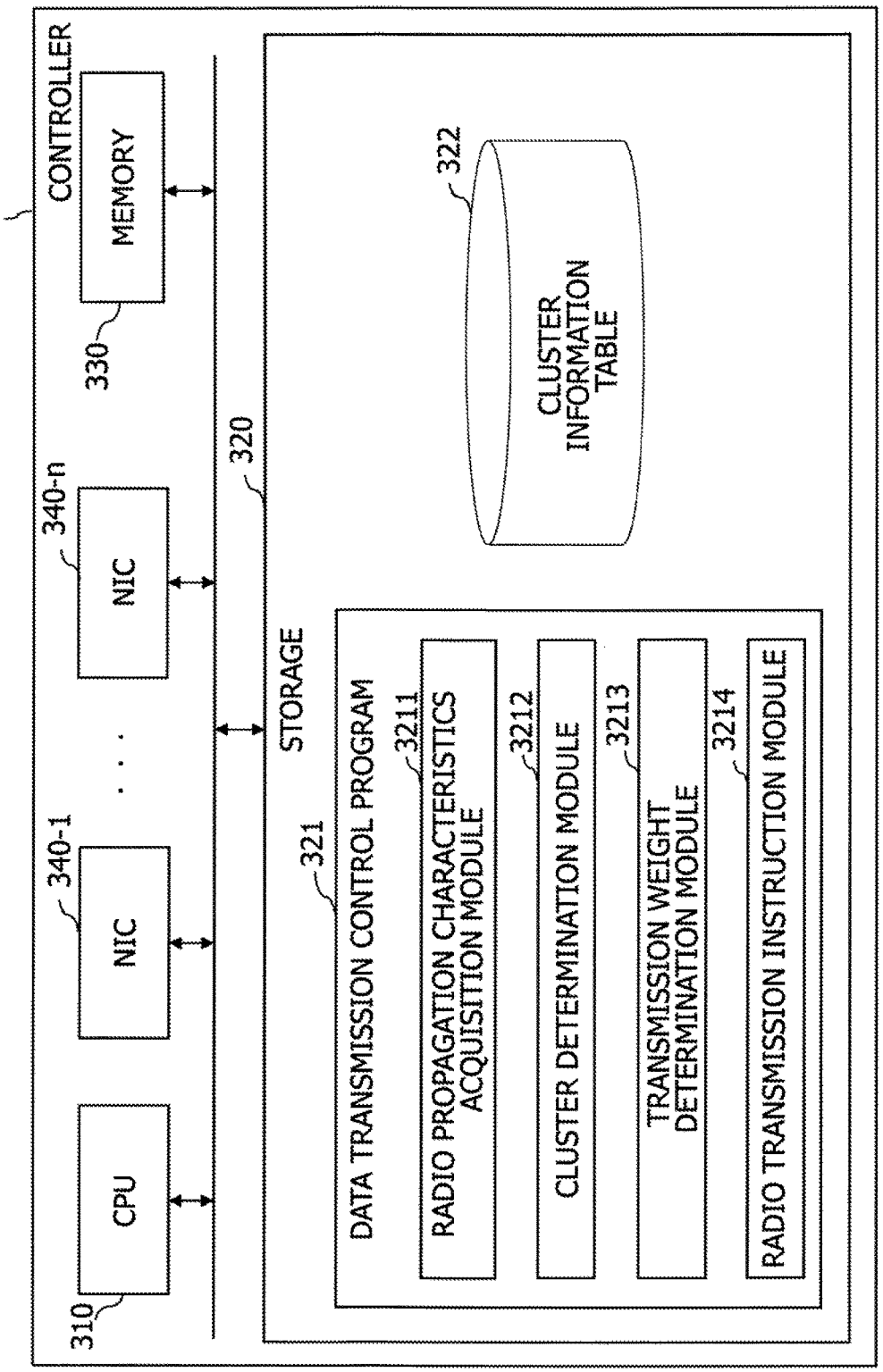
FIG. 2 is a diagram illustrating a configuration example of the controller 300.

FIG. 2 is a diagram illustrating a configuration example of the controller 300. The controller 300 is, for example, a computer, and has a central processing unit (CPU) 310, a storage 320, a memory 330 such as a dynamic random access memory (DRAM), and network interface cards (NICs) 340-1 to 340-n.

The storage 320 is an auxiliary storage device such as a hard disk drive (HDD) and a solid state drive (SSD) that stores a program or data. The storage 320 stores a data transmission control program 321 and a cluster information table 322.

The cluster information table 322 is a table that stores information on a cluster determined for each of the terminal devices 100. The elements of the information stored in the cluster information table 322 include, for example, the names or numbers of clusters, the identifiers of the constituting radio devices 200, the identifiers of the corresponding terminal devices 100, or the like. The cluster information table 322 is updated when each cluster is determined.

The memory 330 is a region in which a program stored in the storage 320 is loaded. In addition, the memory 330 is used as a region in which a program stores data.

The NICs 340-1 to 340-n are devices that are connected to the radio devices 200 and the external network 400 and performs communication. The NICs 340-1 to 340-n may be connected to other devices via hubs or switches.

The CPU 310 is a processor that loads a program stored in the storage 320 into the memory 330 and runs the loaded program to realize respective processing.

In addition, the CPU 310 runs the data transmission control program 321 and respective modules to perform data transmission control processing. The data transmission control processing is processing to cooperatively transmit data to the terminal device 100. The CPU 310 runs respective modules 3211 to 3213 of the data transmission control program 321 to construct respective processing units and realize the processing of the respective processing units.

In addition, the CPU 310 runs a radio propagation characteristics acquisition module 3211 to construct an acquisition unit and realize radio propagation characteristics acquisition processing to be performed by the acquisition unit. The radio propagation characteristics acquisition processing is processing in which the controller acquires the radio propagation characteristics between the terminal device 100 to which data is to be transmitted and the respective radio devices 200. The radio propagation characteristics are barometers indicating the radio quality between the terminal device 100 and the radio devices 200, and include, for example, the receiving power to receive at the radio devices 200 a pilot signal transmitted from the terminal device 100 to measure the radio propagation characteristics.

For example, when receiving data to be transmitted to the terminal device 100 from the external network 400, the controller 300 instructs the terminal device 100 to transmit the pilot signal in order to acquire the respective radio propagation characteristics of the radio devices 200. Alternatively, the terminal device 100 may periodically transmit the pilot signal. Then, the radio devices 200 acquire the radio propagation characteristics (for example, the receiving power) between the radio devices 200 and the terminal device 100 from the received pilot signal and transmits the acquired radio propagation characteristics to the controller 300. The controller 300 acquires the radio propagation characteristics transmitted from the respective radio devices 200.

Note that the controller 300 considers the radio propagation characteristics between the radio devices 200 and the terminal device 100 as being the same in a bidirectional direction, and is allowed to estimate the power to receive at the radio devices 200 the pilot signal as the power to receive radio waves at the terminal device 100, which are transmitted from the radio devices 200.

In addition, the CPU 310 runs a cluster determination module 3212 to construct a determination unit and realize cluster determination processing to be performed by the determination unit. The cluster determination processing is processing to determine a plurality of radio devices 200 of which the radio propagation characteristics are relatively higher among the plurality of radio devices 200 from which the radio propagation characteristics have been acquired as the radio devices 200 constituting the cluster of the terminal device 100. For example, the controller 300 selects a prescribed number of the radio devices 200 in an order in which the power of the radio devices 200 to receive the pilot signal is greater, and determines the selected radio devices 200 as the cluster corresponding to the terminal device 100. The prescribed number is, for example, the number of the radio devices 200 corresponding to the amount of data to be transmitted to the terminal device 100 (i.e., the greater the amount of the data, the greater the number of the radio devices 200 is) or the number of the radio devices 200 by which a time for calculating the transmission weights with the controller 300 is made shorter than a time (reference time) at which the transmission of data to the terminal device 100 is not delayed.

In addition, the CPU 310 runs a transmission weight determination module 3213 to construct a control unit and realize transmission weight determination processing. The transmission weight determination processing is processing to determine the transmission weights of radio waves to be transmitted to the terminal device 100 based on the respective radio propagation characteristics of the radio devices 200 constituting the cluster to which the terminal device 100 belongs.

Moreover, the CPU 310 runs a radio transmission instruction module 3214 to construct a control unit and realize radio transmission instruction processing. The radio transmission instruction processing is processing to instruct (radio transmission instruction) the respective radio devices 200 constituting the cluster to transmit data to the terminal device 100 with the determined transmission weights.

(Configuration Example of Radio Devices)

Figure 3:
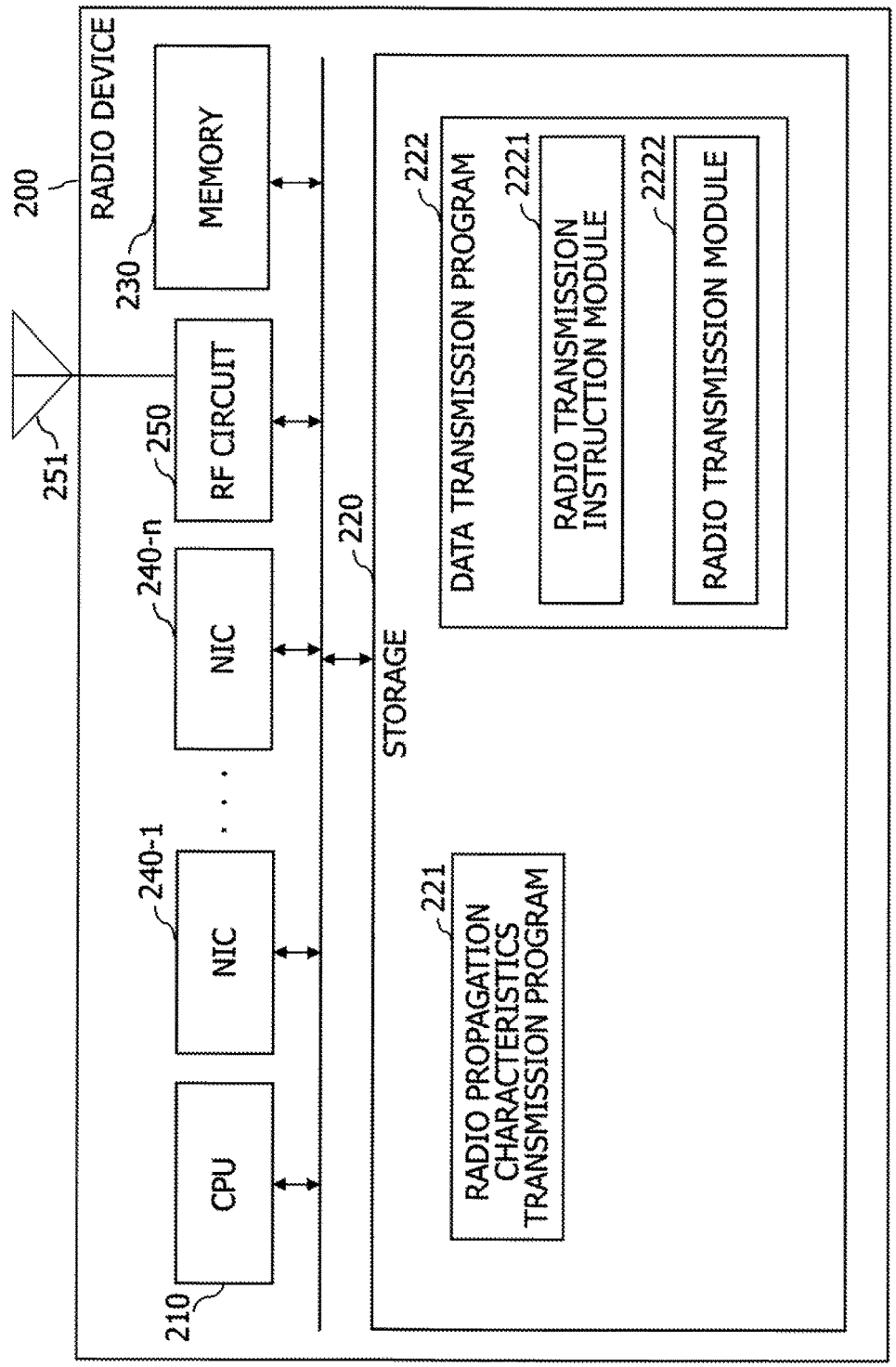
FIG. 3 is a diagram illustrating a configuration example of the radio devices 200.

FIG. 3 is a diagram illustrating a configuration example of the radio devices 200. The radio devices 200 have a CPU 210, a storage 220, a memory 230, NICs 240-1 to 240-n, a radio frequency (RF) circuit 250, and an antenna 251.

The CPU 210, the storage 220, the memory 230, and the NICs 240-1 to 240-n are the same as the CPU 310, the storage 320, the memory 330, and the NICs 340-1 to 340-n of FIG. 2, respectively.

However, the storage 220 stores a radio propagation characteristics transmission program 221 and a data transmission program 222. Further, the RF circuit 250 is a device that realizes the transmission of radio waves via the antenna 251. The RF circuit 250 transmits, for example, radio waves including data to the terminal device 100.

The CPU 210 runs the radio propagation characteristics transmission program 221 to construct a measurement transmission unit and realize radio propagation characteristics transmission processing. The radio propagation characteristics transmission processing is processing to receive a pilot signal transmitted from the terminal device 100 to measure the radio propagation characteristics between the radio devices 200 and the terminal devices 100 and transmit a measurement result to the controller 300 as the radio propagation characteristics.

In addition, the CPU 210 runs the data transmission program 222 and respective modules to construct a transmission unit and realize data transmission processing. The data transmission processing is processing to transmit data, which has been received from the controller 300 and is to be transmitted to the terminal device 100, with a transmission weight instructed by the controller 300.

In addition, the CPU 210 runs a radio transmission instruction reception module 2221 to realize radio transmission instruction reception processing. The radio transmission instruction reception processing is processing to receive data or a transmission weight to be transmitted to the terminal device 100 from the controller 300.

Moreover, the CPU 210 runs a radio transmission module 2222 to realize radio transmission processing. The radio transmission processing is processing to transmit data, which has been received in the radio transmission instruction reception processing and is to be transmitted to the terminal device 100, with an instructed transmission weight. For example, the radio device 200 controls the RF circuit 250 to realize the transmission of radio waves with an instructed transmission weight.

(Configuration Example of Terminal Device)

Figure 4:
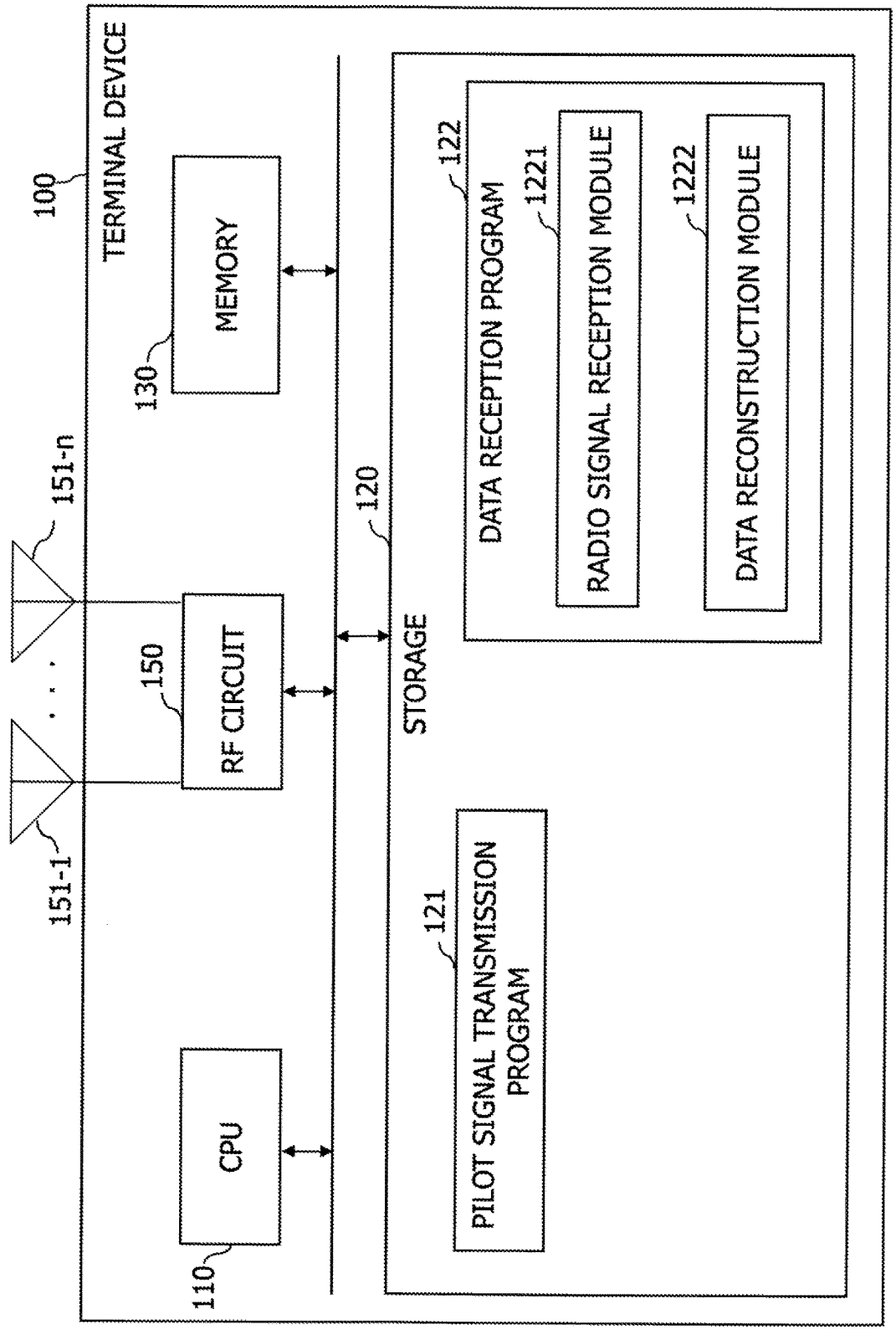
FIG. 4 is a diagram illustrating a configuration example of the terminal device 100.

FIG. 4 is a diagram illustrating a configuration example of the terminal device 100. The terminal device 100 has a CPU 110, a storage 120, a memory 130, a RF circuit 150, and antennas 151-1 to 151-n.

The CPU 110, the storage 120, the memory 130, the RF circuit 150, and the antennas 151-1 to 151-n are the same as the CPU 210, the storage 220, the memory 230, the RF circuit 250, and the antenna 251 of FIG. 3, respectively.

However, the storage 120 stores a pilot signal transmission program 121 and a data reception program 122.

In addition, the terminal device 100 has the plurality of antennas 151-1 to 151-n in order to receive data transmitted by, for example, single user adaptive MIMO.

The CPU 110 runs the pilot signal transmission program 121 to construct a transmission unit and realize pilot signal transmission processing. The pilot signal transmission processing is processing to transmit a pilot signal for causing the radio devices 200 to measure radio propagation characteristics periodically or with the reception of an instruction from the controller 300. The pilot signal is, for example, a radio signal transmitted with a preset frequency and transmission power.

In addition, the CPU 110 runs the data reception program 122 and its modules to construct a reception unit and realize data reception processing. The data reception processing is processing to receive data transmitted from the respective radio devices 200 constituting a cluster and reconstruct original data from, for example, the plurality of received data.

Moreover, the CPU 110 runs a radio signal reception module 1221 to realize radio signal reception processing. The radio signal reception processing is processing to acquire a radio signal received by the RF circuit 150 and convert the radio signal into the data of an internal processing format.

Further, the CPU 110 runs a data reconstruction module 1222 to realize data reconstruction processing. The data reconstruction processing is processing to reconstruct different data received via the plurality of antennas into original data.

(Data Transmission Control Processing)

In the first embodiment, the controller 300 determines, when receiving data to be transmitted to the terminal device 100 from the external network 400, a cluster to which the terminal device 100 belongs. The data transmission control processing is processing by the controller 300 to determine the cluster and instruct the respective radio devices 200 to transmit the data to the terminal device 100. Hereinafter, the data transmission control processing by the controller 300 will be described.

Figure 5:
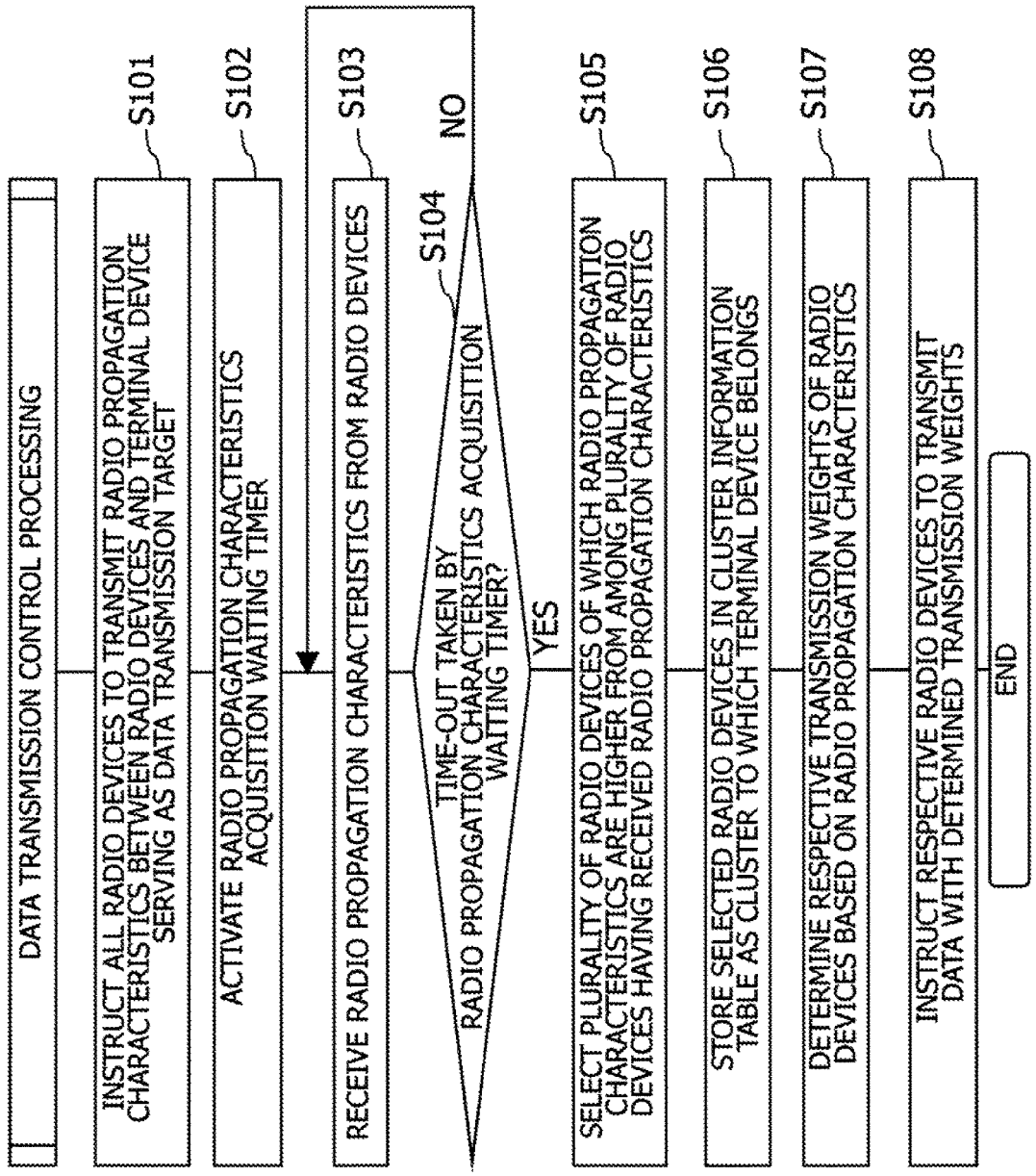
FIG. 5 is a diagram illustrating an example of the flowchart of the data transmission control processing by the controller 300.

FIG. 5 is a diagram illustrating an example of the flowchart of the data transmission control processing by the controller 300. When receiving data to be transmitted to the terminal device 100 from the external network 400, the controller 300 performs the data transmission control processing in order to transmit the data to the terminal device 100 via the radio devices 200 inside a cluster.

The controller 300 instructs all the radio devices 200 under the control of the communication system 10 to transmit the radio propagation characteristics between the radio devices 200 and the terminal device 100 (S101). At this time, the controller 300 may instruct the terminal device 100 to transmit a pilot signal used to measure the radio propagation characteristics via the currently-connected radio devices 200 simultaneously.

Then, the controller 300 activates a radio propagation characteristics acquisition waiting timer (S102). The radio propagation characteristics acquisition waiting timer is a guard timer to deal with a case in which the radio devices 200 that do not transmit the radio propagation characteristics exit even after a prescribed time or more elapses. The controller 300 continuously receives the radio propagation characteristics from the radio devices 200 (S103) until a time-out is taken by the radio propagation characteristics acquisition waiting timer (Yes in S104) during the activation of the radio propagation characteristics acquisition waiting timer (No in S104). Hereinafter, receiving power will be described as an example of the radio propagation characteristics.

Figure 6:
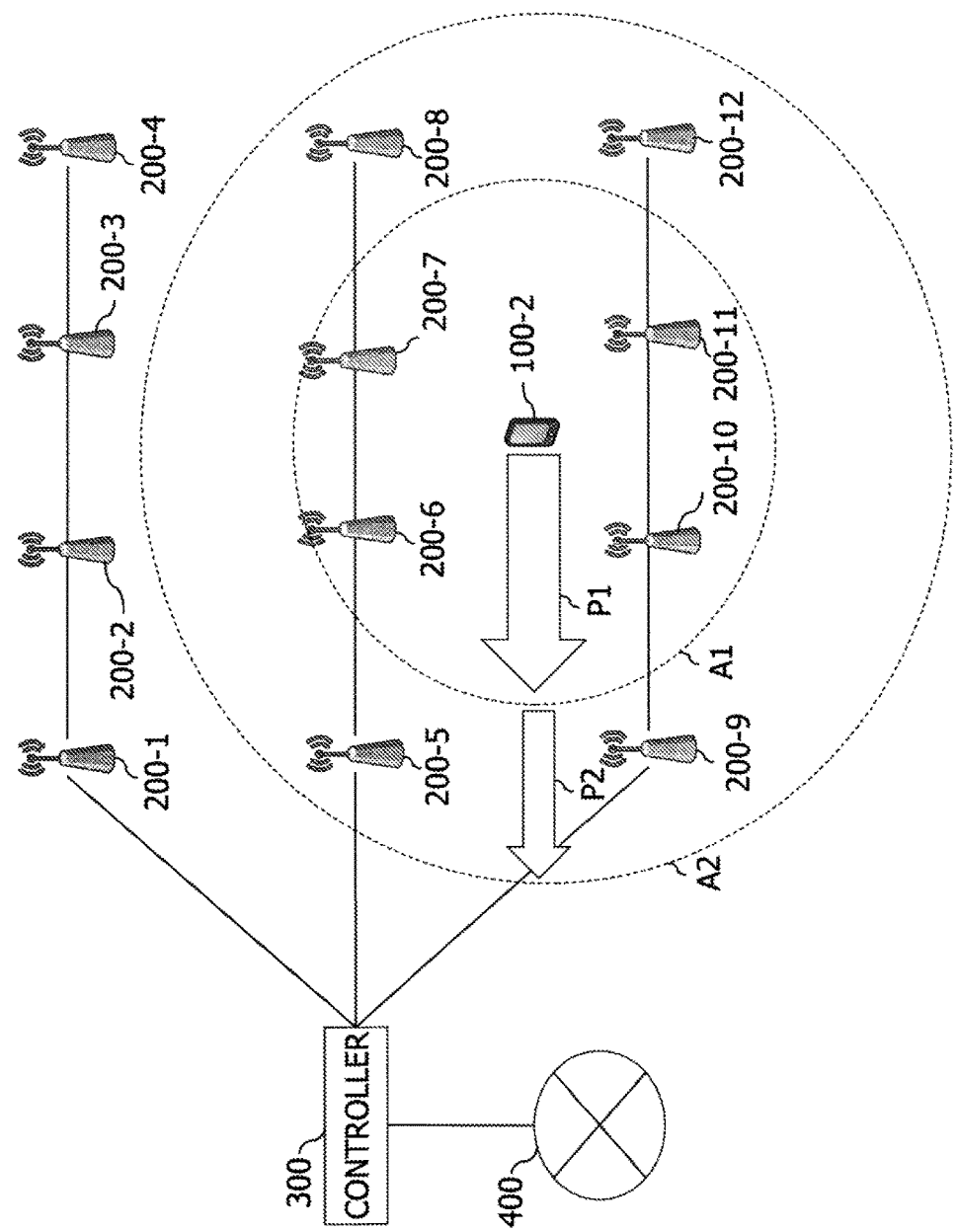
FIG. 6 is a diagram illustrating an example of the receiving power to receive at the radio devices 200 a pilot signal transmitted from a terminal device 100-2.

FIG. 6 is a diagram illustrating an example of the receiving power to receive at the radio devices 200 a pilot signal transmitted from a terminal device 100-2. The terminal device 100-2 transmits the pilot signal as a response to the reception of an instruction from the controller 300 or transmits the same periodically. In FIG. 6, it is assumed that an area in which the respective radio devices 200 are allowed to receive the pilot signal with receiving power P1 is an area A1 and an area in which the respective radio devices 200 are allowed to receive the pilot signal with receiving power P2 is an area A2.

The radio propagation characteristics used to determine the transmission weights that will be described later are the receiving power to receive radio waves at the terminal device 100, which are transmitted from the radio devices. Therefore, the controller 300 acquires the receiving power to receive at the radio devices 200 the pilot signal transmitted from the terminal device 100, and estimates the acquired receiving power at the respective radio devices 200 as the receiving power to receive the radio waves at the terminal device 100, which are transmitted from the respective radio devices 200. This is based on the premise that the value of the receiving power to receive the radio waves at the terminal device 100, which are transmitted from the radio devices 200 and the value of the receiving power to receive the radio waves at the radio devices 200, which are transmitted from the terminal device 100 are the same or almost the same in the communication system 10. When the terminal device 100 is allowed to measure the receiving power to receive the radio waves at the terminal device 100, which are transmitted from the respective radio devices 200, the receiving power may be measured by the terminal device 100.

In FIG. 6, radio devices 200-6, 200-7, 200-10, and 200-11 are positioned inside the area A. Accordingly, the radio devices 200-6, 200-7, 200-10, and 200-11 receive the pilot signal transmitted from the terminal device 100-2 with receiving power greater than or equal to P1. As a result, the radio devices 200-6, 200-7, 200-10, and 200-11 acquire the radio propagation characteristics indicating that the receiving power is greater than or equal to P1.

In addition, in FIG. 6, radio devices 200-5, 200-8, 200-9, and 200-12 are positioned outside the area A1 and inside the area A2. Accordingly, the radio devices 200-5, 200-8, 200-9, and 200-12 receive the pilot signal transmitted from the terminal device 100-2 with receiving power greater than or equal to P2 and less than P1. As a result, the radio devices 200-5, 200-8, 200-9, and 200-12 acquire the radio propagation characteristics indicating that the receiving power is greater than or equal to P2 and less than P1.

Moreover, in FIG. 6, radio devices 200-1 to 200-4 are positioned outside the areas A1 and A2. Accordingly, the radio devices 200-1 to 200-4 acquire the radio propagation characteristics indicating that the receiving power to receive at the radio devices the pilot signal transmitted from the terminal device 100-2 is less than P2. Note that when the receiving power P2 is a numeric value less than or equal to the receiving sensitivity of the radio devices 200, the radio devices 200-1 to 200-4 are not allowed to receive the pilot signal transmitted from the terminal device 100-2. In this case, the controller 300 is not allowed to acquire the radio propagation characteristics of the radio devices 200-1 to 200-4. Hereinafter, an example in which the controller 300 is not allowed to acquire the radio propagation characteristics of the radio devices 200-1 to 200-4 will be described.

Referring back to the processing flowchart of FIG. 5, the controller 300 acquires the radio propagation characteristics (receiving power) from the respective radio devices 200 illustrated in FIG. 6. The controller 300 selects a plurality of radio devices 200 of which the radio propagation characteristics are higher (the receiving power is relatively greater) from among the plurality of radio devices 200 from which the radio propagation characteristics (receiving power) have been received (S105). In FIG. 6, the radio devices 200 from which the radio propagation characteristics (receiving power) have been received are the totally eight radio devices 200 of the radio devices 200-5 to 200-8 and the radio devices 200-9 to 200-12. Then, the controller 300 selects, from among the eight radio devices 200, the four radio devices 200-6, 200-7, 200-10, and 200-11 of which the receiving power is greater than or equal to P1 as the plurality of radio devices 200 of which the radio propagation characteristics are higher. The controller 300 determines a cluster constituted by the four selected radio devices 200 as the cluster of the terminal device 100-2.

Figure 7:
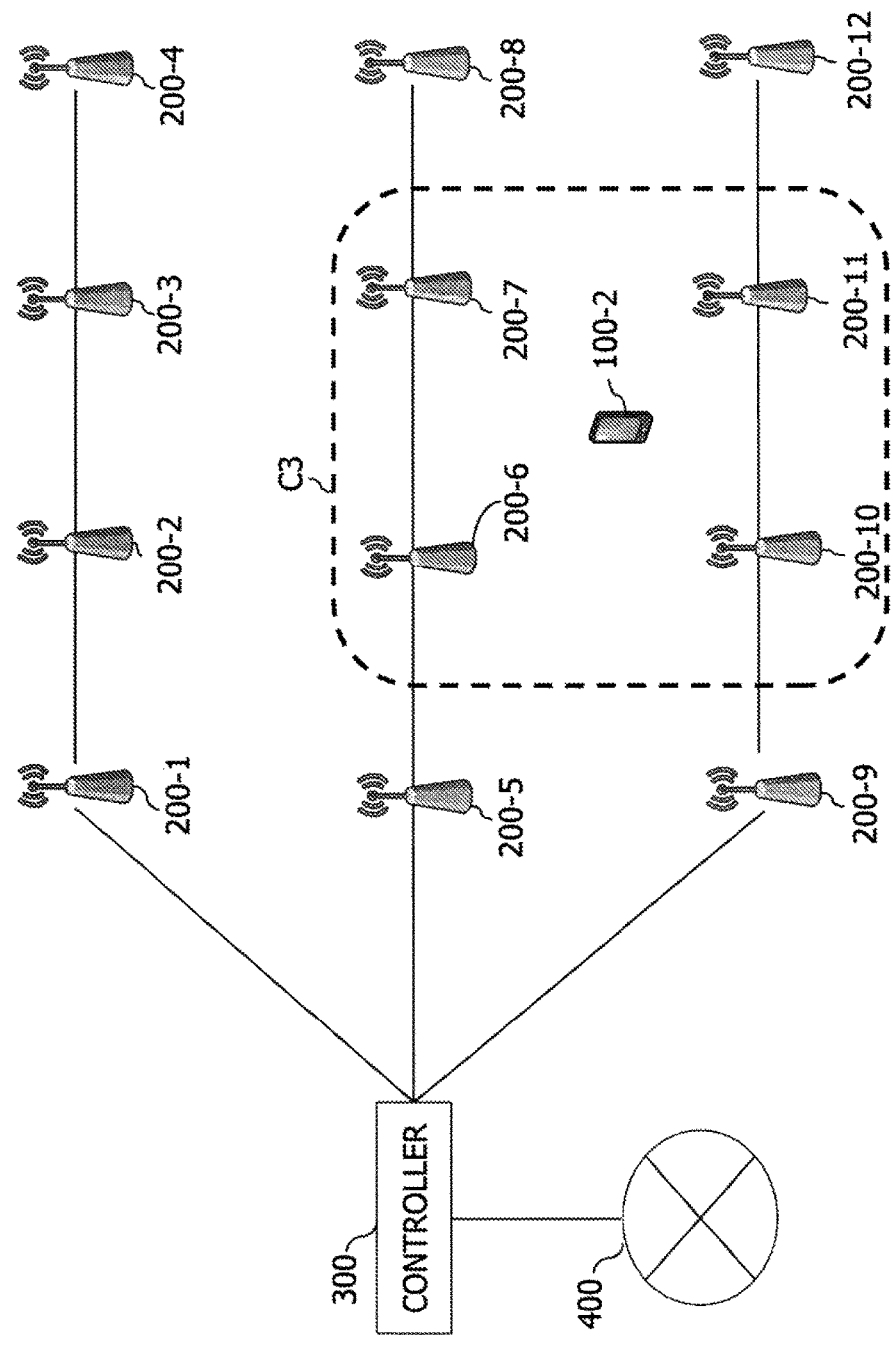
FIG. 7 is a diagram illustrating an example of the cluster of the terminal device 100-2.

FIG. 7 is a diagram illustrating an example of the cluster of the terminal device 100-2. As illustrated in FIG. 7, the controller 300 determines a cluster C3 constituted by the radio devices 200-6, 200-7, 200-10, and 200-11 as the cluster of the terminal device 100-2.

Referring back to the processing flowchart of FIG. 5, the controller 300 stores the selected radio devices 200 in the cluster information table 322 as the cluster to which the terminal device 100-2 belongs (S106).

FIG. 8 is a diagram illustrating an example of the cluster information table 322. The elements of the information stored in the cluster information table 322 include, for example, a "cluster numbers," a "radio device," and a "belonging terminal device." The "cluster number" includes the number or identifier of a cluster, which indicates information for discrimination between clusters. The "radio device" includes the identifiers of the radio devices 200 constituting the cluster. The "belonging terminal device" includes the identifier of the terminal device 100 belonging to the cluster. In the cluster information table 322 of FIG. 8, number C3 of the cluster to which the terminal device 100-2 belongs and the radio devices 200-6, 200-7, 200-10, and 200-11 indicating the radio devices 200 constituting the cluster C3 are stored according to storage processing S106.

Referring back to the processing flowchart of FIG. 5, the controller 300 determines the respective transmission weights of the radio devices 200 constituting the determined cluster (S107). The controller 300 calculates the transmission weights based on the acquired radio propagation characteristics (receiving power). The controller 300 calculates the transmission weights of the respective radio devices 200 so that the combinations of receiving quality from the respective radio devices 200 at the terminal device 100-2 become the best or close to the best. Here, the receiving quality is a barometer for indicating to what degree fine radio waves are receivable, and includes, for example, the total value of the receiving power to receive radio waves at the terminal device 100, which are transmitted from the respective radio devices 200 or the total value of the differences (or ratios) between the receiving power to receive the radio waves at the terminal device 100, which are transmitted from the respective radio devices 200, and the power of generated noise. For example, the controller 300 calculates the transmission weights so that the total of the receiving power to receive radio waves at the terminal device 100-2, which are transmitted from the respective radio devices 200, becomes maximum. By the optimum combination of the phases of transmitted radio waves and transmitting power illustrating an example of the transmission weights, the combination of the receiving quality at the terminal device 100 becomes optimum.

Then, the controller 300 instructs the radio devices 200 constituting the cluster to which the terminal device 100-2 belongs to transmit the data with the determined transmission weights (S108). When receiving the instruction, the radio devices 200 transmit the data to the terminal device 100-2 with the determined transmission weights.

As described above, in the first embodiment, the controller 300 determines the radio devices 200 of which the radio propagation characteristics are higher as the cluster to which the terminal device 100 belongs. That is, the controller 300 dynamically determines an optimum cluster for the terminal device 100. Thus, the terminal device 100 is allowed to receive data from the plurality of radio devices 200 constituting the dynamically-determined cluster with greater receiving power and fine radio receiving quality regardless of where the terminal device 100 moves in the communication system.

Second Embodiment

Next, a second embodiment will be described. The second embodiment will describe the processing of a controller 300 when one or more of radio devices (first radio devices) 200 constituting a cluster (first cluster) determined by the controller 300 are overlapped with one or more of radio devices (second radio devices) 200 constituting another cluster (second cluster). The controller 300 determines the respective transmission weights of the first radio devices constituting the first cluster based on the first receiving power to receive radio waves at a first terminal device belonging to the first cluster, which are transmitted from the first radio devices, and the second receiving power to receive the radio waves at a second terminal device belonging to the second cluster, which are transmitted from the first radio devices.

(Data Transmission Control Processing)

The data transmission processing of the controller 300 in the second embodiment when at least one or more of first radio devices constituting a first cluster to which a first terminal device belongs are overlapped with at least one or more of second radio devices constituting a second cluster to which a second terminal device belongs will be described.

Figure 9:
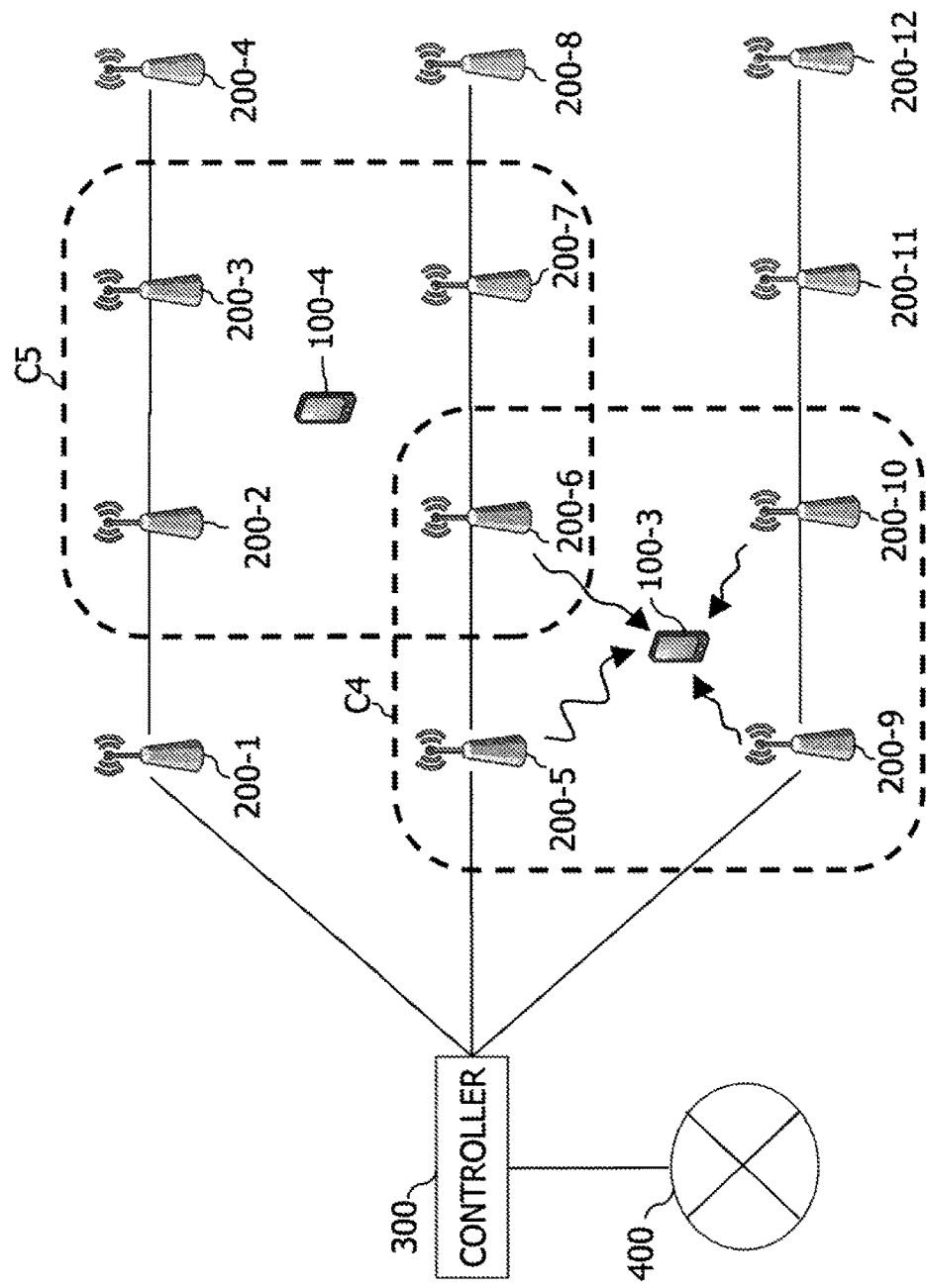
FIG. 9 is a diagram illustrating an example of a communication system 10 when a cluster to which a terminal device 100-4 belongs is determined.

FIG. 9 is a diagram illustrating an example of a communication system 10 when a cluster to which a terminal device 100-4 belongs is determined. In FIG. 9, at a moment at which the controller 300 has determined a cluster C5 to which the terminal device 100-4 belongs, terminal devices 200 constituting a cluster C4 are transmitting data to a terminal device 100-3. In addition, since both the clusters C4 and C5 include a radio device 200-6 as illustrated in FIG. 9, the clusters C4 and C5 are clusters in which the radio device 200-6 is overlapped between the clusters C4 and C5.

In FIG. 9, the cluster C5 is a first cluster, and the cluster C4 is a second cluster. Similarly, the terminal device 100-4 is a first terminal device, and the terminal device 100-3 is a second terminal device. In addition, radio devices 200-2, 200-3, 200-6, and 200-7 are first radio devices, and radio devices 200-5, 200-6, 200-9, and 200-10 are second radio devices. The radio device 200-6 serves not only as the first radio device but as the second radio device.

FIG. 10 is a diagram illustrating an example of a cluster information table when the communication system 10 is put into a state illustrated in FIG. 9.

The controller 300 confirms whether the identifiers of the cluster C5 of the radio devices 200 stored in the "radio device" of a cluster information table 322 are overlapped with the identifiers of the radio devices 200 of another cluster. Based on the cluster information table 322, the controller 300 determines that the radio device 200-6 is overlapped between the clusters C4 and C5, and determines that one or more of the radio devices 200 are overlapped between the clusters C4 and C5.

Data transmission control processing by the controller 300 of the second embodiment will be described using the processing flowchart of FIG. 5 again like the first embodiment. Note that since processing steps from radio propagation characteristics transmission instruction processing S101 to cluster information storage processing S106 of the second embodiment are the same as those of the first embodiment, their duplicated descriptions will be omitted. Note that in the second embodiment, radio propagation characteristics are the receiving power to receive radio waves at the terminal device 100, which are transmitted from the radio devices 200, and are equivalent to the receiving power to receive at the radio devices 200 a pilot signal transmitted from the terminal device 100.

As illustrated in the processing flowchart of FIG. 5, the controller 300 determines the respective transmission weights of the radio devices 200 (first radio devices) constituting the cluster C5 (first cluster) (S107). At this time, the controller 300 determines the respective transmission weights (first transmission weights) of the first radio devices based on the receiving power to receive the radio waves at the first terminal device 100-4, which are transmitted from the first radio devices, and the receiving power (second receiving power) of the second terminal device 100-3 to receive the radio waves transmitted from the first radio devices.

In the communication system 10, the groups of the radio devices constituting the respective clusters C4 and C5 of FIG. 9 transmit data to the respective terminal devices 100-4 and 100-3, respectively, at their own timings according to, for example, MIMO. One or more of the radio devices 200-6 are overlapped between the clusters C4 and C5, and the clusters are positioned adjacent to each other. Accordingly, the radio waves transmitted from the groups of the radio devices of the respective clusters may interfere with the terminal devices 100 of the adjacent clusters depending on their transmission timings.

Accordingly, the controller 300 in the second embodiment regards the clusters of which one of more of the radio devices 200 are overlapped with each other as the adjacent clusters with which the radio waves may interfere, and determines the respective transmission weights of the first radio devices in consideration of the second receiving power as well.

For example, the controller 300 calculates the transmission weights (first transmission weights) of the first radio devices with which a difference in the receiving power obtained by subtracting the second receiving power from the first receiving power becomes maximum. Thus, the controller 300 is allowed to determine the transmission weights of the first radio devices that increase the receiving power at the first terminal device serving as a data transmission target, and that reduce interfering power with respect to the second terminal device.

The transmission weight determination processing of the second embodiment is processing in a case in which the radio devices 200 of the first cluster to which the terminal device 100 (first terminal device) serving as a data transmission target belongs and the radio devices 200 of the second cluster to which the other terminal device 100 (second terminal device) belongs are partially overlapped with each other. In this case, the controller 300 determines the transmission weights of the radio devices 200 of the first cluster in consideration of the radio waves reaching the other terminal device 100 as well. Thus, it is possible to increase the receiving power to receive the radio waves at the first terminal device while preventing the radio waves transmitted from the radio devices 200 of the first cluster from interfering with the second terminal device, and realize fine receiving quality in both the first terminal device 100 and the second terminal device 100.

Third Embodiment

Next, a third embodiment will be described. In the third embodiment, when the number of terminal devices 100 belonging to a cluster is greater than an allowable number within which the cluster is allowed to transmit data simultaneously or parallelly, a controller 300 selects any of the terminal devices 100 within the allowable number.

(Configuration Example of Controller)

Figure 11:
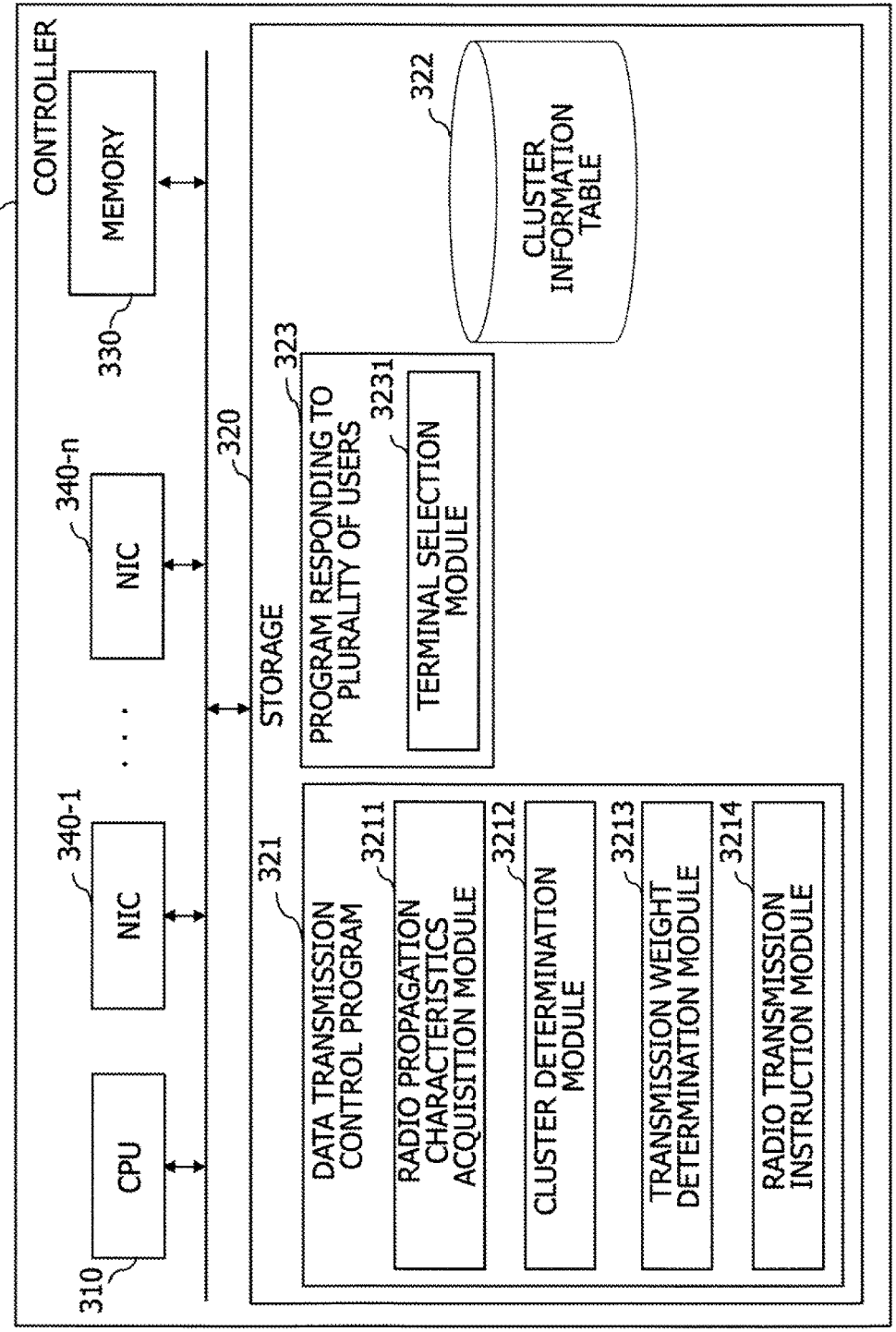
FIG. 11 is a diagram illustrating a configuration example of the controller 300.

FIG. 11 is a diagram illustrating a configuration example of the controller 300. The controller 300 stores a program 323 responding to a plurality of users (hereinafter simply called the program 323) in a storage 320 as well.

A CPU 310 runs the program 323 and its module to construct a control unit and perform processing responding to a plurality of users to be performed by the control unit. The processing responding to a plurality of users is, for example, processing such as MU-MIMO corresponding to the transmission of data to a plurality of users (terminal devices 100) simultaneously with one cluster.

In addition, the CPU 310 runs a terminal selection module 3231 to realize terminal selection processing. The terminal selection processing is processing to select, when the number of the terminal devices 100 belonging to a cluster is greater than or equal to the number of the terminal devices (an allowable number) within which the cluster is allowed to perform communication simultaneously, any of the terminal devices 100 within the allowable number as the terminal devices 100 to which data is to be transmitted. For example, when a cluster starts the transmission of data to the terminal devices 100, the controller 300 refers to the cluster information table 322 to determine whether the number of the terminal devices 100 belonging to the cluster is greater than or equal to an allowable number. When the number of the terminal devices 100 is greater than or equal to the allowable number, the controller 300 performs the terminal selection processing.

(Terminal Selection Processing)

In the third embodiment, the controller 300 performs the terminal selection processing when the number of the terminal devices 100 (first terminal devices) belonging to a cluster (first cluster) is greater than or equal to an allowable number. The terminal selection processing is processing to be performed instead of, for example, the processing S107 of the processing flowchart of FIG. 5 in the first embodiment.

Figure 12:
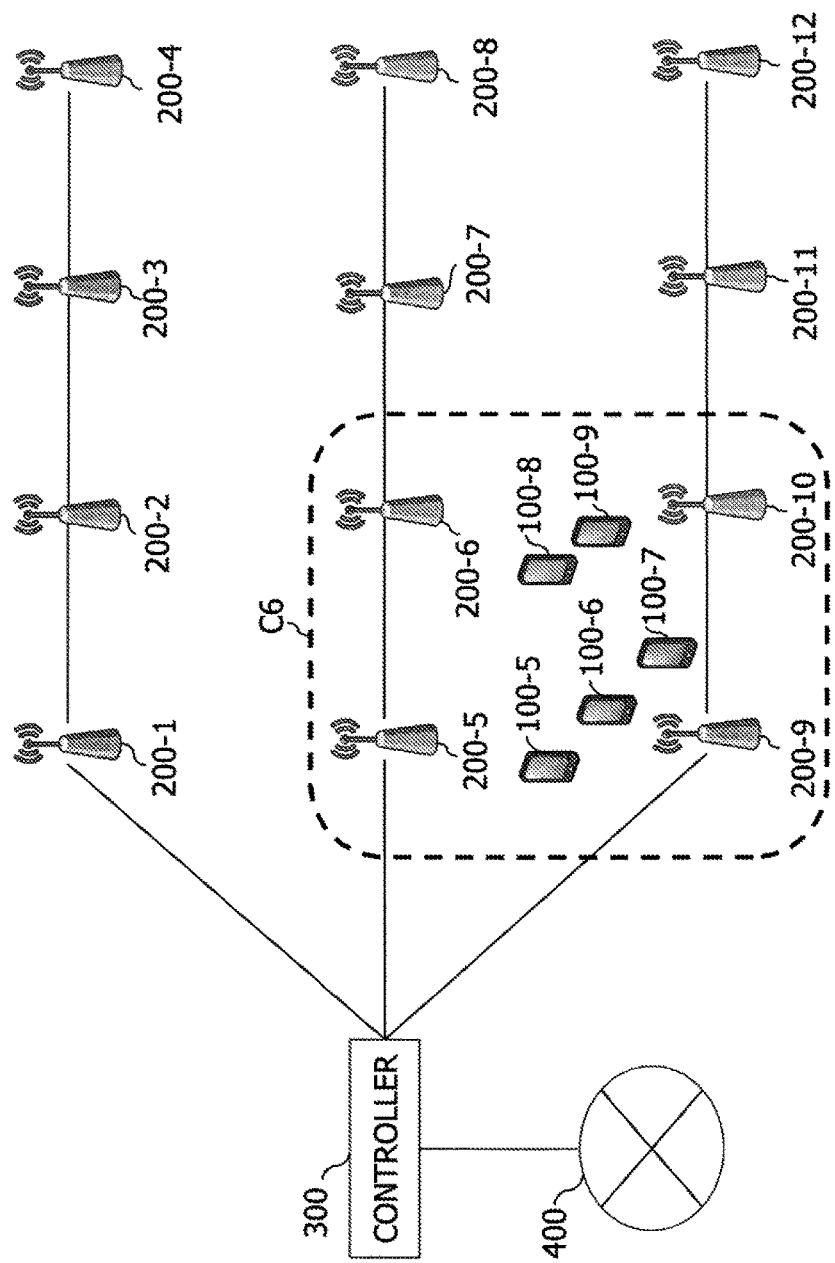
FIG. 12 is a diagram illustrating an example of a communication system 10 in which the number of the terminal devices 100 belonging to one cluster is greater than or equal to an allowable number.

FIG. 12 is a diagram illustrating an example of a communication system 10 in which the number of the terminal devices 100 belonging to one cluster is greater than or equal to an allowable number. In FIG. 12, five terminal devices 100-5 to 100-9 belong to a cluster C6 constituted by four radio devices 200-5, 200-6, 200-9, and 200-10.

Figure 13:
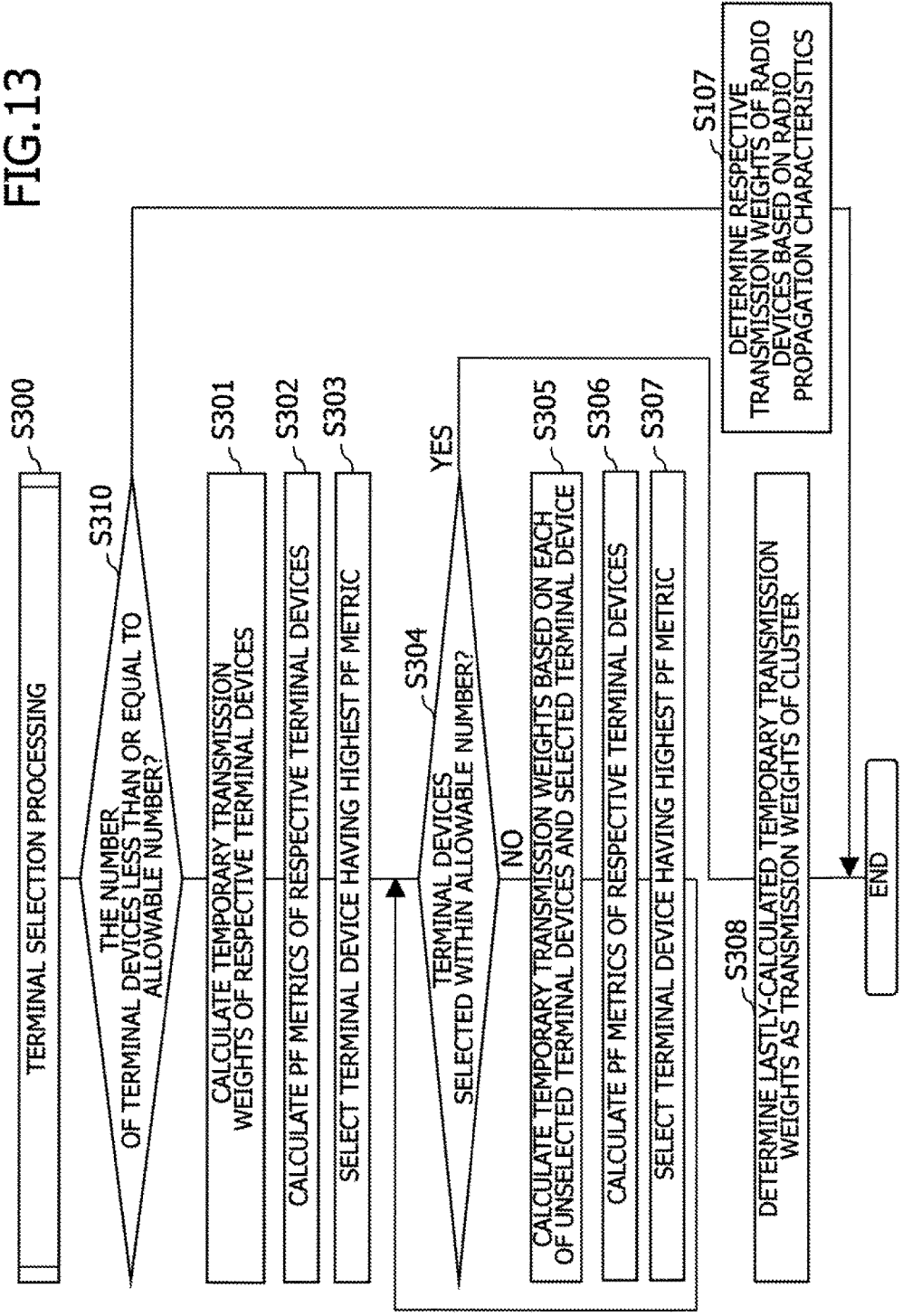
FIG. 13 is a diagram illustrating an example of the processing flowchart of the terminal selection processing by the controller 300.

FIG. 13 is a diagram illustrating an example of the processing flowchart of the terminal selection processing by the controller 300. Hereinafter, the processing flowchart of FIG. 13 will be described using the communication system 10 of FIG. 12 as an example.

In the terminal selection processing S300, the controller 300 refers to the cluster information table 322 to confirm whether the number of terminal devices belonging to a cluster is less than or equal to an allowable number (S310). When the number of the terminal devices belong to the cluster is less than or equal to the allowable number (Yes in S310), the controller 300 performs processing S107 same as that of the processing flowchart of FIG. 5 and then ends the processing. When the number of the terminal devices belonging to the cluster is neither equal to nor less than the allowable number (No in S310), the controller 300 performs processing operations following the processing S301. In FIG. 12, since the number of the terminal devices 100 belonging to the cluster C6 is five and greater than or equal to the allowable number (i.e., four) of the cluster 6 (No in S310), the controller 300 performs the following processing.

In the terminal selection processing S300, the controller 300 calculates temporary transmission weights when the respective terminal devices 100 are selected (S301). In FIG. 12, the controller 300 calculates the temporary transmission weights of the radio devices 200 of the cluster C6 when the respective terminal devices 100 are selected. In the calculation of the temporary transmission weights, it is assumed that the terminal devices 100 are selected. For example, in the calculation of the temporary transmission weights when the terminal device 100-5 is selected, it is assumed that data is not to be transmitted to the terminal devices 100 other than the terminal device 100-5. Then, the controller 300 calculates the temporary transmission weights of the radio devices 200-5, 200-6, 200-9, and 200-10 based on the radio propagation characteristics (receiving power) of the terminal device 100-5. Similarly, the controller 300 calculates the temporary transmission weights of the radio devices 200-5, 200-6, 200-9, and 200-10 when other terminal devices 100-6 to 100-9 are selected. A method for calculating the temporary transmission weights is the same as the method for calculating the transmission weights in the transmission weight calculation processing S107 of the processing flowchart of FIG. 5 in the first embodiment.

Then, the controller 300 calculates the proportional fairness (PF) metrics of the respective terminal devices 100 based on the temporary transmission weights (S302). The PF metrics are the ratios of the predicted instantaneous radio quality to the past average radio quality of the terminal devices 100. The radio quality is, for example, a throughput indicating the amount of data received per unit time. The terminal devices 100 having a low PF metric are the terminal devices 100 of which the past average radio quality is low, i.e., the terminal devices 100 of which the amount of data received in a past certain period is small. In addition, the terminal devices 100 having a high PF metric are the terminal devices 100 of which the predicted radio quality is high, i.e., the terminal devices 100 positioned in a favorable radio environment. The controller 300 calculates an estimated throughput indicating an estimated receiving data amount per unit time based on, for example, temporary transmission weights with respect to one terminal device 100. Then, the controller 300 calculates a numeric value (proportion) obtained by dividing the calculated estimated throughput by an average throughput indicating a past receiving data amount per unit time of the terminal device 100 as the PF metric of the terminal device 100. In FIG. 12, the controller 300 calculates the PF metrics of the respective terminal devices 100-5 to 100-9.

Then, the controller 300 selects the terminal device 100 having the highest PF metric (S303). Since the controller 300 sets one of the terminal devices 100 having a high PF metric as a data transmission target, the terminal devices 100 of which the past receiving data amount is small are given a receiving opportunity and fairness in the data receiving opportunity between the terminal devices is assured. In addition, since the controller 300 sets one of the terminal devices 100 having the highest PF metric as a data transmission target, data is transmitted to the terminal devices 100 positioned in a favorable radio environment, whereby fine receiving quality is expectable. In FIG. 12, the controller 300 selects the terminal device (for example, the terminal device 100-5) having the highest PF metric (S303).

Next, the controller 300 confirms whether the terminal devices 100 have been selected within the allowable number of the cluster (S304). When the terminal devices 100 have been selected within the allowable number (Yes in S304), the controller 300 does not perform processing S305 to S308.

Here, the allowable number will be described. The allowable number is the number of the terminals within which the cluster is allowed to perform communication simultaneously. The allowable number is, for example, the maximum number of the terminal devices 100 allowed to receive data with receiving power greater than or equal to reference power, the terminal devices 100 belonging to the cluster as data transmission targets. For example, the greater the number of the terminal devices 100 belonging to the cluster as data transmission targets, the smaller the average value of the receiving power at each of the terminal devices 100 becomes.

Therefore, the controller 300 sets the allowable number for each cluster so that the receiving power at the terminal devices 100 does not become less than or equal to the reference power indicating minimum receiving power at which the terminal devices 100 are allowed to receive data. Note that according to an experiment or a simulation, the receiving quality of the terminal devices 100 extremely reduces, for example, when the number of the terminal devices 100 exceeds the number of the radio devices 200 constituting a cluster. Accordingly, the allowable number may match the number of the radio devices 200 constituting the cluster. Hereinafter, in the third embodiment, the number (i.e., four) of the radio devices 200 constituting the cluster C6 will be described as the allowable number of the cluster C6.

When the terminal devices 100 have not been selected within the allowable number of the cluster (No in S304), the controller 300 selects the next terminal device (second terminal device) 100. As the selection processing of the next terminal device 100, the controller 300 calculates temporary transmission weights based on each of unselected terminal devices 100 and the selected terminal device 100 (S305). For example, in FIG. 12, assuming that the selected terminal device 100-5 and the unselected terminal device 100-6 are set as data transmission targets, the controller 300 calculates the temporary transmission weights when the terminal device 100-6 is selected. Similarly, the controller 300 calculates the temporary transmission weights in a case in which each of the unselected terminal devices 100-7 to 100-9 is selected. Note that when setting the plurality of terminal devices 100 as data transmission targets, the controller 300 calculates the temporary transmission weights so that the combinations of the receiving quality of each of the selected terminal devices 100 to receive data from the respective radio devices 200 become the best or close to the best. In addition, the controller 300 may calculate the respective transmission weights so that the total of the receiving power to receive at the terminal devices 100 data from the respective radio devices 200 becomes maximum.

Then, like the processing S302 and S303 performed when the first terminal device 100 is selected, the controller 300 calculates the PF metrics of the respective terminal devices 100 (S306) and selects the terminal device 100 having the highest PF metric (S307). In FIG. 12, the controller 300 selects the terminal device (for example, the terminal device 100-6) having the highest PF metric as the terminal device 100 of the second data transmission target.

Like the selection of the second terminal device 100, the controller 300 selects the third and fourth terminal devices 100.

The controller 300 repeatedly performs the selection of the terminal devices 100 until the number of the selected terminal devices 100 reaches the allowable number (Yes in S304). When the number of the selected terminal devices 100 reaches the allowable number (Yes in S304), the controller 300 determines the lastly-calculated temporary transmission weights as the transmission weights of the radio devices 200 constituting the cluster (S308).

In the third embodiment, when a plurality of terminal devices 100 belongs to one cluster, the controller 300 selects any of the terminal devices 100 within an allowable number as data transmission targets. The controller 300 selects the terminal devices 100 one by one, and then selects the next terminal device 100 based on transmission weights considering the receiving power at the selected terminal device 100.

As a method for selecting any of terminal devices 100 as data transmission targets within an allowable number from among the plurality of terminal devices 100 constituting one cluster, there is a method in which all the combinations of the terminal devices 100 within the allowable number are extracted, the PF metrics of all the combinations are calculated, and one of the combinations having the highest the PF metric is selected. However, this method causes a problem that, when many terminal devices 100 belong to one cluster, the number of the extracted combinations of the terminal devices 100 becomes large, the calculation of transmission weights used to calculate the average PF metrics of all the combinations takes a time, and the transmission of data to the terminal devices 100 is delayed. According to the method for selecting any of the terminal devices 100 in the third embodiment, it is possible to select the terminal devices 100 without calculating the transmission weights and the PF metrics of all the combinations.

Fourth Embodiment

Next, a fourth embodiment will be described. In the fourth embodiment, a method for calculating temporary transmission weights when adjacent radio devices 200 exist as described in the second embodiment is applied to the calculation of temporary transmission weights in the selection processing of a plurality of terminal devices 100 in a cluster as described in the third embodiment.

In the fourth embodiment, one or more of the radio devices 200 constituting a first cluster and a second cluster are overlapped between the first cluster and the second cluster. In the selection of the terminal devices 100 of the first cluster, a controller 300 calculates temporary transmission weights assuming that each of the unselected terminal devices 100 of the first cluster is selected. Then, the controller 300 performs the calculation of the temporary transmission weights based on the radio propagation characteristics (receiving power) of the second terminal devices belonging to the second cluster to receive radio waves transmitted from the radio devices 200 of the first cluster besides the radio propagation characteristics (receiving power) of the radio devices 200 in the first cluster.

(Terminal Selection Processing)

Figure 14:
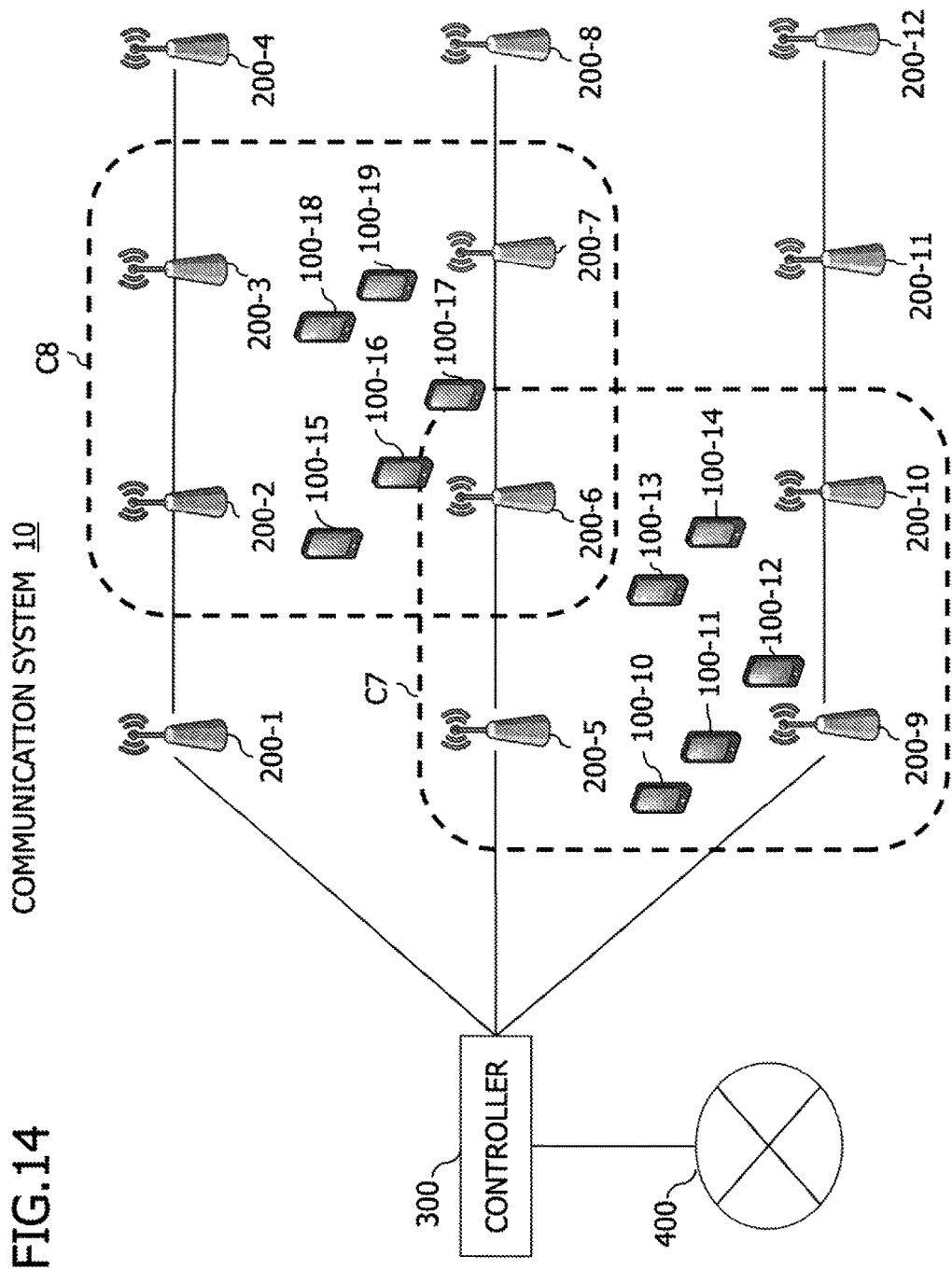
FIG. 14 is a diagram illustrating a configuration example of a communication system 10 in the fourth embodiment.

FIG. 14 is a diagram illustrating a configuration example of a communication system 10 in the fourth embodiment. Five terminal devices 100-10 to 100-14 belong to a cluster C7, and the number of the terminal devices 100-10 to 100-14 exceeds the allowable number of the cluster C7 (i.e., four). In addition, five terminal devices 100-15 to 100-19 belong to a cluster C8, and the number of the terminal devices 100-15 to 100-19 exceeds the allowable number of the cluster C8 (i.e., four). Moreover, the clusters C7 and C8 share a radio device 200-6 as a constituent of the radio devices 200. Hereinafter, a cluster in which the selection of the terminal devices 100 is performed will be called a selection target cluster (first cluster), and a cluster of which one or more of the radio devices 200 are overlapped with one or more of the radio devices 200 of the selection target cluster will be called an overlapped cluster (second cluster).

FIG. 15 is a diagram illustrating an example of a cluster information table 322. In FIG. 15, a cluster indicated by 1 is the cluster C7, and a cluster indicated by 2 is the cluster C8. The cluster C7 is constituted by radio devices 200-5, 200-6, 200-9, and 200-10, and the terminal devices 100-10 to 100-14 belong to the cluster C7. The cluster C8 is constituted by radio devices 200-2, 200-3, 200-6, and 200-7, and the terminal devices 100-15 to 100-19 belong to the cluster C8.

The controller 300 refers to the cluster information table 322 to recognize whether the plurality of terminal devices 100 belongs to the clusters C7 and C8, and performs the terminal selection processing.

Figure 16:
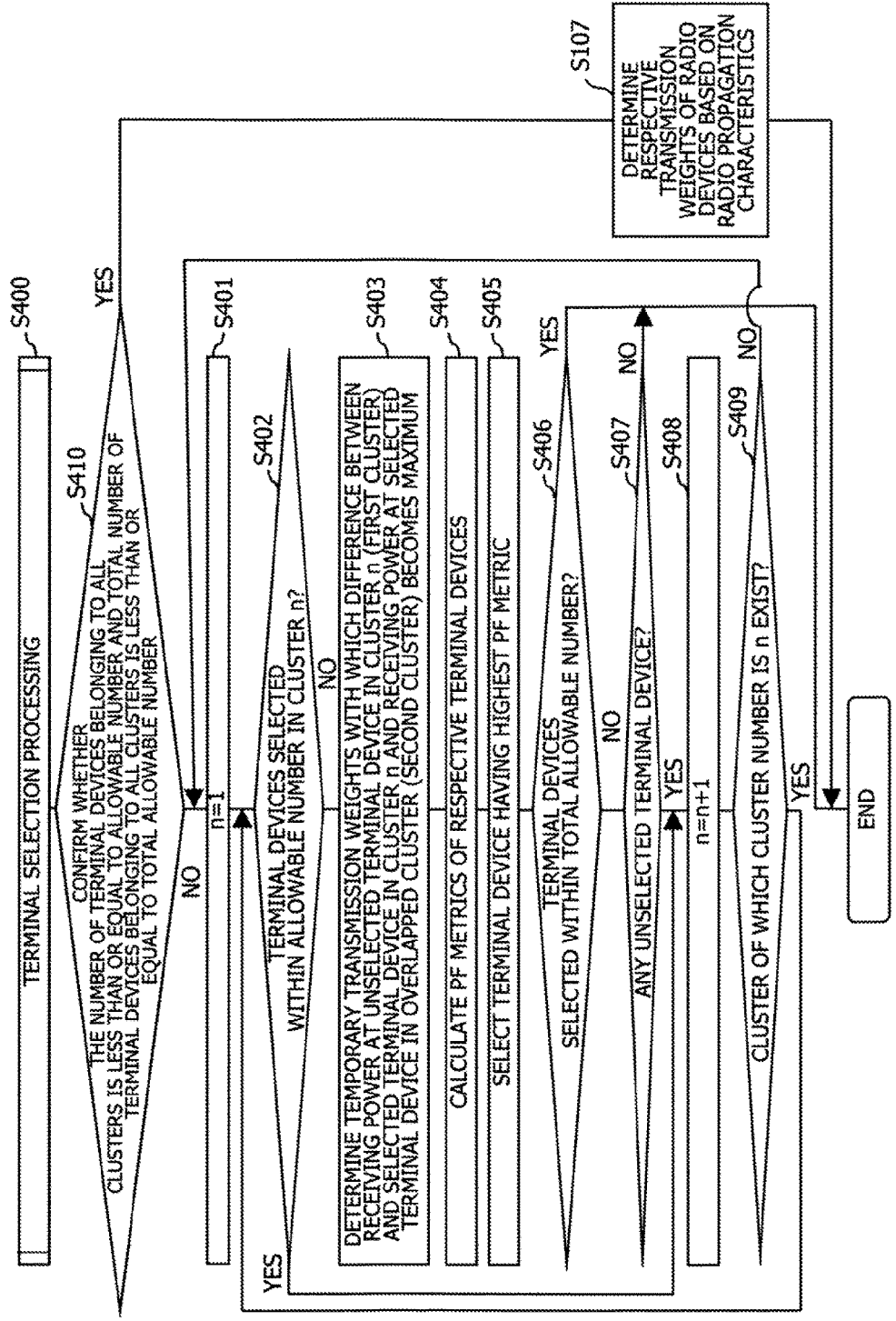
FIG. 16 is a diagram illustrating an example of the processing flowchart of the terminal selection processing by the controller 300 when one or more of the radio devices 200 constituting the clusters C7 and C8 are overlapped between the clusters C7 and C8.

FIG. 16 is a diagram illustrating an example of the processing flowchart of the terminal selection processing by the controller 300 when one or more of the radio devices 200 constituting the clusters C7 and C8 are overlapped between the clusters C7 and C8.

When the clusters C7 and C8 are overlapped clusters overlapped with each other as illustrated in FIG. 14, the controller 300 selects the terminal devices 100 one by one from the respective clusters. This is because the controller 300 performs the selection of the terminal device 100 in the selection target cluster in consideration of influence on the selected terminal device 100 of the overlapped cluster, and the details will be described using the processing flowchart of FIG. 16.

In addition, when performing the selection of the terminal devices in a plurality of clusters one by one, the controller 300 selects the terminal devices 100 so that the number of the terminal devices 100 selected from the plurality of clusters becomes less than or equal to the total allowable number of the plurality of clusters. For example, when the number of the radio devices 200 constituting the clusters is set as the allowable number of each of the clusters, the allowable number of the clusters C7 and C8 is four. However, since the total number of the radio devices 200 of both the clusters is seven, the total allowable number of the clusters C7 and C8 becomes seven. The controller 300 selects the terminal devices 100 from the respective clusters as data transmission targets so that the number of the terminal devices 100 becomes less than or equal to the total allowable number (i.e., seven).

As described above, according to an experiment or a simulation, the receiving quality of the terminal devices 100 extremely reduces when the number of the terminal devices 100 exceeds the number of the radio devices 200 constituting a cluster. Similarly, according to an experiment or a simulation, even in the case of a plurality of clusters as well as a single cluster, the receiving quality of the terminal devices 100 extremely reduces when the number of selected terminal devices 100 exceeds the number of the radio devices 200 constituting the plurality of clusters. Accordingly, in the terminal selection processing of the fourth embodiment, the controller 300 selects the terminal devices 100 so that the number of the terminal devices 100 does not exceed the total allowable number of the plurality of clusters besides the allowable number of each of the clusters.

Figure 17:
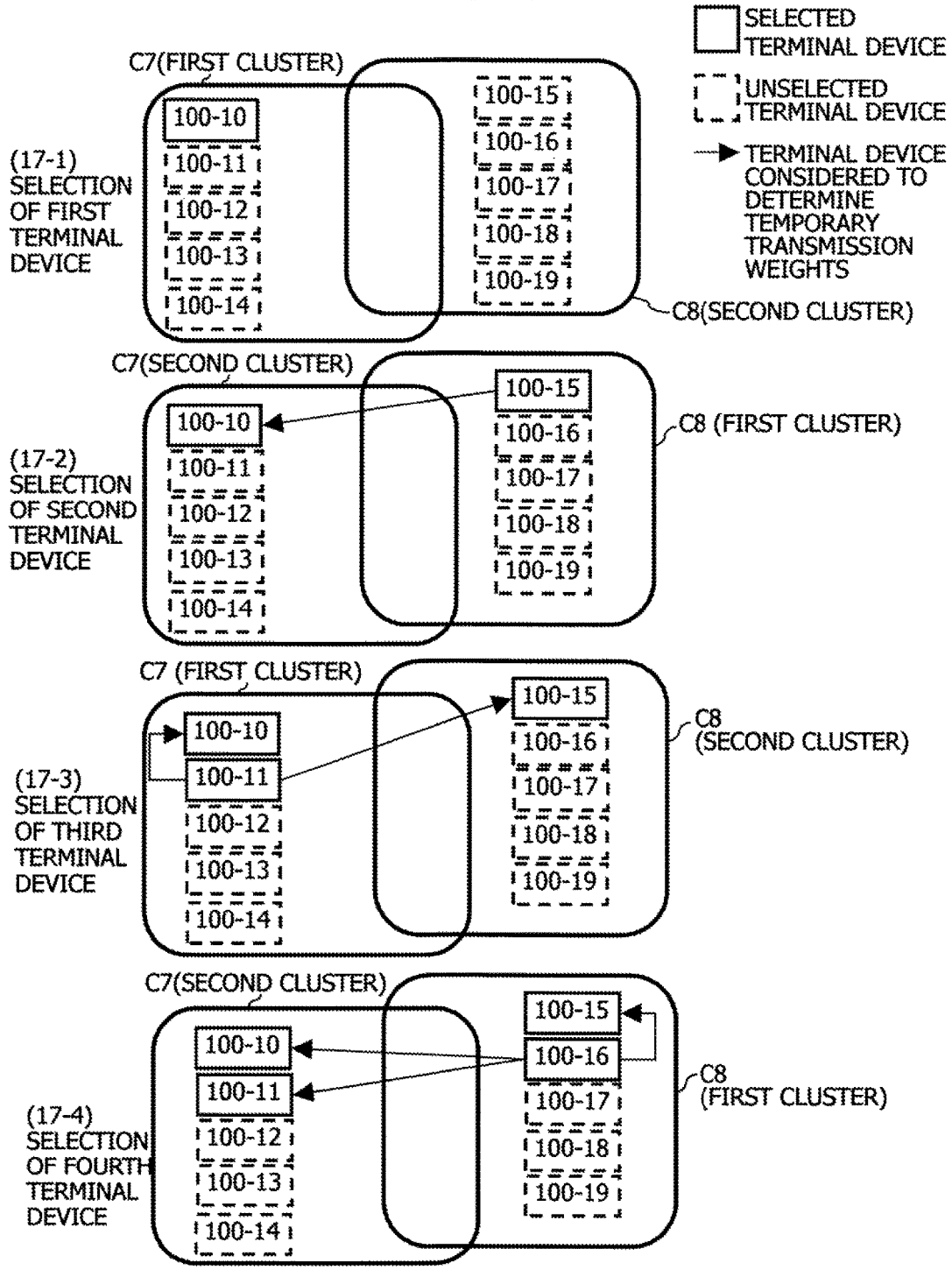
FIG. 17 is a diagram illustrating an example of selecting the terminal devices 100 from each of the clusters C7 and C8.

FIG. 17 is a diagram illustrating an example of selecting the terminal devices 100 from each of the clusters C7 and C8. Hereinafter, the flowchart of the terminal selection processing of FIG. 16 will be described using the example of FIG. 17.

In terminal selection processing S400, the controller 300 refers to the cluster information table 322 to confirm whether the number of the terminal devices 100 belonging to the respective clusters is less than or equal to the allowable number and the total number of the terminal devices 100 belonging to all the clusters is less than or equal to the total allowable number (S410). When the number of the terminal devices 100 belonging to the respective clusters is less than or equal to the allowable number and the total number of the terminal devices 100 belonging to all the clusters is less than or equal to the total allowable number (Yes in S410), the controller 300 performs processing same as the processing S107 of the processing flowchart of FIG. 5 and ends the processing. When the number of the terminal devices 100 belonging to the respective clusters is less than or equal to the allowable number and the total number of the terminal devices 100 belonging to all the clusters is neither equal to nor less than the total allowable number (No in S410), the controller 300 performs processing operations following processing S401. In FIG. 14, since the five terminal devices 100 belong to the cluster C7 and the five terminal devices 100 belong to the cluster C8, i.e., the ten terminal devices 100 belong to the clusters in total (No in S410), the controller 300 performs the following processing.

Note that when selecting the terminal devices 100 from the plurality of clusters, the controller 300 alternately repeatedly selects the terminal devices 100 from each of the plurality of clusters.

((17-1) Selection of First Terminal Device)

The controller 300 selects the terminal devices 100 one by one from a plurality of overlapped clusters. As illustrated in FIG. 16, the controller 300 substitutes 1 indicating the cluster number of the selection target cluster of the first terminal device 100 into the cluster number "n" (n=1) (S401), and starts the selection of the terminal devices 100 from the cluster C7 of which the cluster number is 1. That is, in the selection of the first terminal device 100, the selection target cluster (first cluster) is the cluster C7, and the overlapped cluster (second cluster) is the cluster C8.

The controller 300 confirms whether the terminal devices 100 have been selected within the allowable number (=four) of the first cluster C7 (S401). Since none of the terminal devices 100 have been selected since the terminal selection processing (No in S402), the controller 300 performs the selection of the first terminal device 100.

In the selection of the first terminal device 100, the controller 300 performs temporary transmission weight determination processing (S403). In the temporary transmission weight determination processing S403, it is assumed that one of the unselected terminal devices 100 of the selection target cluster n is selected. The controller 300 determines the temporary transmission weights with which the difference between the receiving power at a terminal device 100 assumed to be selected and a selected terminal device 100 of a selection target cluster n and the receiving power at a selected terminal device 100 of an overlapped cluster becomes maximum. The temporary transmission weight determination processing is performed for each of the unselected terminal devices 100.

In the selection of the first terminal device 100, none of the terminal devices 100 have been selected from both the first cluster C7 and the second cluster C8. Accordingly, the controller 300 determines the temporary transmission weights with which the difference between the receiving power at the temporarily-selected one of the unselected terminal devices 100 and zero selected terminal device 100 of the first cluster C7 and the receiving power at zero selected terminal device 100 of the second cluster C8 becomes maximum. The temporary transmission weight determination processing is performed assuming that each of the terminal devices 100-10 to 100-14 of the first cluster C7 is selected. Accordingly, a method for determining the temporary transmission weights here is the same as the transmission weight calculation processing S107 of FIG. 5 in the first embodiment. Then, the controller 300 calculates the PF metrics of the terminal devices 100-10 to 100-14 based on the determined temporary transmission weights (S404), and selects the terminal device 100 having the highest PF metric (S405). In the example of FIG. 17, the controller 300 selects the terminal device 100-10, and sets the terminal device 100-10 as the selected terminal device 100.

After selecting the first terminal device 100, the controller 300 confirms whether the terminal devices 100 have been selected within the total allowable number (S406). When the terminal devices 100 have been selected within the total allowable number (Yes in S406), the controller 300 ends the terminal selection processing.

When the terminal devices 100 have not been selected within the total allowable number (No in S406), the controller 300 confirms whether any unselected terminal device exists (S407). When no unselected terminal device 100 exists in all the plurality of the clusters (No in S407), the controller 300 ends the terminal selection processing. Here, since the number of the selected terminal devices 100 is one and smaller than the total allowable number (i.e., seven), the controller 300 proceeds to the next processing (No in S406).

When any unselected terminal device 100 exists (Yes in S407), the controller 300 increments n (n=n+1) (S408). Then, when n is less than or equal to the number of the overlapped clusters (Yes in S409), the controller 300 performs the selection of the terminals from the next cluster. In addition, when n is greater than the number of the overlapped clusters (No in S409), the controller 300 resets n to 1 (S401) and performs the selection of the terminals from the first cluster.

((17-2) Selection of Second Terminal Device)

In FIG. 17, in a state in which the one terminal device 100-10 has been selected from the first cluster C7, the number of the selected terminal devices 100 is less than or equal to the total allowable number (No in S406), and the nine unselected terminal devices 100 exist (Yes in S407). The controller 300 determines that the cluster number is turned into 2 (S408), which is less than or equal to the number of the overlapped clusters (the two clusters of the clusters C7 and C8) (Yes in S409). Then, since none of the terminal devices 100 have not been selected from the cluster C8 of which the cluster number is 2 (No in S402), the controller 300 performs the selection of the second terminal device 100 from the cluster C8. That is, in the selection processing of the second terminal device, the selection target cluster (first cluster) is the cluster C8, and the overlapped cluster (second cluster) is the cluster C7.

The controller 300 performs the temporary transmission weight determination processing S403. The selection of the second terminal device 100 is illustrated in (17-2) of FIG. 17. The controller 300 calculates temporary transmission weights when the respective terminal devices 100 belonging to the first cluster C8 are selected in consideration of the receiving power at the terminal device 100-10 having been selected from the second cluster C7 that serves as the overlapped cluster overlapped with the first cluster C8. A method for determining the transmission weights in consideration of the terminal device 100 having been selected from the overlapped cluster is the same as the method for calculating the transmission weights in the transmission weight calculation processing S107 of the processing flowchart of FIG. 5 in the second embodiment. That is, the controller 300 determines the temporary transmission weights with which the difference between the receiving power at zero selected terminal device 100 and the one selected terminal device 100 of the first cluster C8 and the receiving power at the selected terminal device 100-10 of the second cluster C7 becomes maximum.

Hereinafter, the controller 300 performs processing operations following the processing S404 like the selection of the first terminal device 100.

As illustrated in FIG. 17, the controller 300 selects the terminal device 100-15 as the second terminal device 100, and performs the selection of the third terminal device 100 from the cluster C7 again (No in S409, S401).

((17-3) Selection of Third Terminal Device)

In FIG. 17, in a state in which the one terminal device 100 has been selected from the cluster C7 and the one terminal device 100 has been selected from the cluster C8, i.e., the two terminal devices 100 have been selected in total, the number of the selected terminal devices 100 is less than or equal to the total allowable number (No in S406), and eight unselected terminal devices 100 exist (Yes in S407). Although n becomes equal to 3 (S408), a cluster of which the cluster number is 3 does not exist (No in S409). Therefore, the controller 300 resets n to 1 (S401) to perform the selection of the third terminal device 100 from the cluster C7 of which the cluster number is 1. That is, in the selection processing of the third terminal device, the selection target cluster (first cluster) is the cluster C7, and the overlapped cluster (second cluster) is the cluster C8.

In the selection of the third terminal device, the controller 300 determines temporary transmission weights in consideration of the selected terminal device 100-10 and the temporarily-selected terminal device 100 of the first cluster C7 and the selected terminal device 100-15 of the second cluster C8 as illustrated in FIG. 17 (17-3). The controller 300 assumes that the unselected terminal device 100-11 of the first cluster C7 is set as a selection candidate. The controller 300 determines the temporary transmission weights with which the difference between the total receiving power at the selected terminal device 100-10 and the terminal device 100-11 serving as a selection candidate and the receiving power at the selected terminal device 100-15 of the second cluster C8 to receive radio waves transmitted from the radio devices 200 of the first cluster C7 becomes maximum. The controller 300 performs processing following the processing S404 like the selection of the first and second terminal devices. In the example of FIG. 17, the controller 300 selects the terminal device 100-11.

((17-4) Selection of Fourth Terminal Device)

As illustrated in (17-4) of FIG. 17, the controller 300 selects the terminal device 100-16 of the cluster 2 as the fourth terminal device 100. In the selection processing of the fourth terminal device, the selection target cluster (first cluster) is the cluster C8, and the overlapped cluster (second cluster) is the cluster C7.

When setting the terminal device 100-16 of the first cluster C8 as a selection candidate, the controller 300 determines temporary transmission weights with which the difference between the total receiving power at the selected terminal device 100-15 and the terminal device 100-16 of the first cluster and the receiving power at the selected terminal devices 100-10 and 100-11 of the second cluster C7 becomes maximum.

As described above, the controller 300 selects the terminal devices 100 one by one from the plurality of clusters. In a state in which the seventh terminal device 100 has been selected, the number of the terminal devices 100 selected from the cluster C8 is three and less than or equal to the allowable number of the cluster C8. Accordingly, since the number of the selected terminal devices 100 reaches the total allowable number (Yes in S406), the controller 300 ends the terminal selection processing.

In the fourth embodiment, the controller 300 selects the terminal devices 100 one by one from each of the clusters. Then, the controller 300 determines the temporary transmission weights in consideration of the terminal devices 100 selected from the overlapped cluster and selects the terminal devices 100 based on PF metrics. Thus, the controller 300 is allowed to select the terminal devices 100 based on the transmission weights determined so as not to interfere with the terminal devices 100 selected from the overlapped cluster, instead of selecting the terminal devices 100 based on the transmission weights in consideration of only the terminal devices 100 in the cluster.

As for clusters that are not overlapped clusters, the controller 300 may set the clusters as those not overlapped with each other and independently select the terminal devices 100 from each of the clusters. However, there is a case that mutual clusters are not overlapped clusters but the respective clusters have common overlapped clusters.

Figure 18:
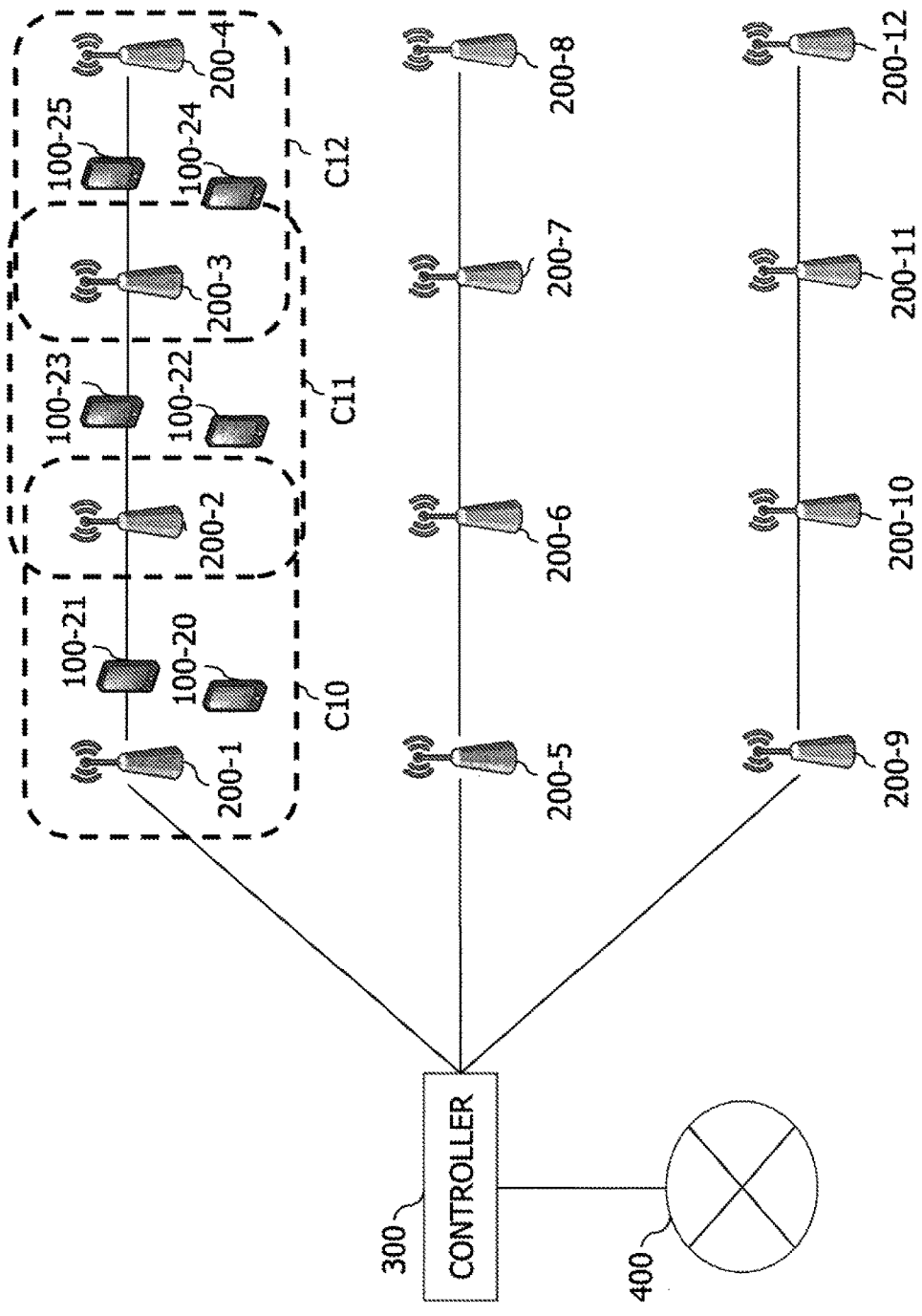
FIG. 18 is a diagram illustrating a configuration example of the communication system 10 in which three clusters are overlapped with each other.

FIG. 18 is a diagram illustrating a configuration example of the communication system 10 in which three clusters are overlapped with each other. FIG. 19 is a diagram illustrating an example of the cluster information table 322 in the case of FIG. 18. A cluster C10 indicated by 1 is constituted by the radio devices 200-1 and 200-2, and terminal devices 100-20 and 100-21 belong to the cluster C10. A cluster C11 indicated by 2 is constituted by the radio devices 200-2 and 200-3, and terminal devices 100-22 and 100-23 belong to the cluster C11. A cluster C12 indicated by 3 is constituted by the radio devices 200-3 and 200-4, and terminal devices 100-24 and 100-25 belong to the cluster C12. In FIG. 18, the clusters C10 and C11 are overlapped clusters, and the clusters C11 and C12 are overlapped clusters. However, the clusters C10 and C12 are not overlapped clusters. Accordingly, for example, when the cluster C10 is a selection target cluster (first cluster), the controller 300 does not consider the selected terminal device 100 of the cluster C12 to determine temporary transmission weights. That is, the clusters C10 and C12 determine the transmission weights without considering the terminal device 100 selected from the mutual clusters.

For example, in FIG. 18, the controller 300 selects the terminal device 100-20 of the cluster C10 as the first terminal device 100. Then, the controller 300 selects the second terminal device 100 from the cluster C11. When selecting the second terminal device 100, the controller 300 selects the second terminal device 100-22 based on temporary transmission weights in consideration of the selected terminal device 100-20 of the overlapped cluster C10. Then, the controller 300 selects the third terminal device 100 from the cluster C12. When selecting the third terminal device 100, the controller 300 does not consider the selected terminal device 100-20 of the cluster C10 not overlapped with the cluster C12 but considers the selected terminal device 100-22 of the overlapped cluster C11 overlapped with the cluster C12 to determine temporary transmission weights. Based on the transmission weights, the controller 300 selects the third terminal device 100-24. As described above, the controller 300 determines the temporary transmission weights without considering the selected terminal device 100 of the non-overlapped cluster.

For example, when the controller 300 has a plurality of processors or calculation processing units and is allowed to simultaneously calculate a plurality of transmission weights, the clusters C10 and C12 may simultaneously select the terminal devices 100 one by one and parallelly calculate the transmission weights. Further, when selecting the terminal device 100 from the cluster C11, the controller 300 calculates transmission weights in consideration of the selected terminal devices 100 of the clusters C10 and C12. Thus, the controller 300 is allowed to parallelly perform calculation processing when selecting the terminal devices from the clusters not overlapped with each other and reduce a time for the calculation processing.

The clusters in the communication system 10 correspond to base station devices in a communication system that receives data from independent base station devices. In the communication system that receive data from independent base station devices, the base station devices are fixedly arranged and not allowed to move so as to put terminal devices in a more comfortable communication environment. In the communication system 10, the clusters are dynamically determined according to the positions of the terminal devices, whereby it is possible to put the terminal devices in a more comfortable communication environment and produce the same effect as when the base station devices are moved in the communication system that receives data from the independent base station devices.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A controller controlling radio transmission of a plurality of radio devices in a radio communication system in which each of the plurality of radio devices constituting a cluster transmits data with a same frequency and with transmission weights for each of the plurality of radio devices to a terminal device belonging to the cluster, the controller comprising:
   a memory; and
   a processor coupled to the memory and configured to:
      acquire radio propagation characteristics between the terminal device and the each of plurality of radio devices;
      determine the plurality of devices constituting the cluster to which the terminal device belongs, based on the acquired radio propagation characteristics; and
      determine transmission weights of each of the plurality of radio devices constituting the cluster, based on the radio propagation characteristics of each of the plurality of radio devices constituting the cluster, and instruct each of the plurality of radio devices constituting the cluster to transmit the data with the determined transmission weights of each of the plurality of radio devices constituting the cluster to the terminal device.

2. The controller according to claim 1, wherein
the radio propagation characteristics include receiving power to receive radio waves at the terminal device, which are transmitted from each of the plurality of radio devices.

3. The controller according to claim 2, wherein
the processor estimates receiving power to receive at each of the plurality of radio devices a pilot signal, which is transmitted from the terminal device to measure the radio propagation characteristics, as the receiving power at the terminal device.

4. The controller according to claim 2, wherein
the radio propagation characteristics become higher as the receiving power increases.

5. The controller according to claim 2, wherein
the processor selects a prescribed number of radio devices in a descending order of the receiving power from among a plurality of radio devices corresponding to the acquired radio propagation characteristics, and determines the selected radio devices as the plurality of radio devices constituting the cluster to which the terminal device belongs.

6. The controller according to claim 5, wherein
the prescribed number is a number of the radio devices by which the determination of the transmission weights is enabled in a shorter time than a reference time.

7. The controller according to claim 2, wherein
the transmission weights include either or both of values of a phase and transmitting power of the radio waves transmitting the data.

8. The controller according to claim 2, wherein
the processor determines the transmission weights with which the receiving power at the terminal device becomes maximum.

9. The controller according to claim 2, wherein,
when one or more of the radio devices constituting a first cluster and a second cluster are overlapped with each other, the controller determines respective transmission weights of first radio devices constituting the first cluster, based on first receiving power to receive radio waves at a first terminal device belonging to the first cluster, which are transmitted from the first radio devices and second receiving power to receive radio waves at a second terminal device belonging to the second cluster, which are transmitted from the first radio devices.

10. The controller according to claim 9, wherein
the processor determines the respective transmission weights of the first radio devices with which a value obtained by subtracting the second receiving power from the first receiving power becomes maximum.

11. The controller according to claim 2, wherein,
when a number of first terminal devices belonging to a first cluster is greater than an allowable number within which the first cluster is allowed to transmit the data parallelly, the processor selects the first terminal devices within the allowable number.

12. The controller according to claim 11, wherein
the allowable number includes a maximum number of the terminal devices that receive the data with the receiving power greater than or equal to reference power.

13. The controller according to claim 11, wherein
the allowable number includes a number of the radio devices constituting the first cluster.

14. The controller according to claim 11, wherein
the processor selects the first terminal devices one by one in the selection, and
the selection of the first terminal devices one by one includes
calculating, for each unselected terminal device, a proportion of an estimated throughput indicating a receiving data amount per unit time of the unselected terminal device estimated by temporary transmission weights determined based on receiving power at the unselected terminal device and a selected terminal device, to an average throughput indicating a past receiving data amount per unit time of the unselected terminal device; and
selecting the unselected terminal device that maximizes the proportion.

15. The controller according to claim 14, wherein
the processor determines the temporary transmission weights with which a value obtained by subtracting a second receiving power to receive radio waves at a second terminal device belonging to the second cluster, which are transmitted from first radio devices constituting the first cluster, from a first receiving power to receive radio waves at a first terminal device belonging to the first cluster, which are transmitted from the first radio devices, becomes maximum.

16. The controller according to claim 14, wherein,
when one or more of the radio devices constituting the first cluster and a second cluster are overlapped with each other, the processor estimates the estimated throughput based on temporary transmission weights based on second receiving power to receive radio waves at second terminal devices belonging to the second cluster, which are transmitted from the radio devices constituting the first cluster besides first receiving power at the unselected terminal device and the selected terminal device.

17. The controller according to claim 16, wherein,
in the selection, the processor selects the first and second terminal devices within a number of the radio devices constituting the first cluster and the second cluster.

18. The controller according to claim 16, wherein,
when selecting the first and second terminal devices from the first cluster and the second cluster, the processor alternately repeatedly performs the selection of one of the first terminal devices from the first cluster and the selection of one of the second terminal devices from the second cluster in the selection of the first and second terminal devices one by one.

19. A communication system comprising:
a plurality of radio devices;
a terminal device configured to receive data via the plurality of radio devices; and
a controller configured to control radio transmission of the plurality of radio devices,
all or part of the plurality of radio devices constituting a cluster, wherein
the controller
acquires radio propagation characteristics between the terminal device and the radio devices,
determines the plurality of radio devices constituting the cluster to which the terminal device belongs, based on the acquired radio propagation characteristics, and
determines the transmission weights of each of the plurality of radio devices constituting the cluster, based on the radio propagation characteristics of each of the plurality of radio devices constituting the cluster and instructs the plurality of radio devices constituting the cluster to transmit the data with the determined transmission weights of each of the plurality of radio devices to the terminal device, and the plurality of radio devices constituting the cluster transmits the data with a same frequency and determined transmission weights of each of the plurality of radio devices to the terminal device.

20. A radio control method by a controller that controls radio transmission of a plurality of radio devices in a radio communication system in which the plurality of radio devices constituting a cluster transmits to a terminal device belonging to the cluster data with a same frequency and transmission weights of each of the plurality of radio devices, the radio control method comprising:
acquiring radio propagation characteristics between the terminal device and the plurality of radio devices;
determining the plurality of radio devices constituting the cluster to which the terminal device belongs, based on the acquired radio propagation characteristics; and
determining the transmission weights of each of the plurality of radio devices constituting the cluster, based on the radio propagation characteristics of each of the plurality of radio devices constituting the cluster, and instructing the plurality of radio devices constituting the cluster to transmit the data with the determined transmission weights of each of the plurality of radio devices constituting the cluster to the terminal device.

* * * * *